(12) United States Patent
Wilensky

(10) Patent No.: US 8,605,940 B1
(45) Date of Patent: Dec. 10, 2013

(54) COHERENT IMAGE MODIFICATION

(75) Inventor: Gregg D. Wilensky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/425,720

(22) Filed: Mar. 21, 2012

Related U.S. Application Data

(63) Continuation of application No. 11/633,061, filed on Dec. 1, 2006, now Pat. No. 8,175,409.

(51) Int. Cl.
*G06K 9/00* (2006.01)

(52) U.S. Cl.
USPC .......................................................... 382/100

(58) Field of Classification Search
USPC ........................... 382/100, 115–118, 254–275
See application file for complete search history.

(56) References Cited

U.S. PATENT DOCUMENTS

| | | | | |
|---|---|---|---|---|
| 5,319,742 | A | * | 6/1994 | Edgar ............................ 345/601 |
| 5,469,536 | A | * | 11/1995 | Blank ............................ 345/594 |
| 5,710,830 | A | | 1/1998 | Holeva |
| 5,768,413 | A | | 6/1998 | Levin et al. |
| 5,771,308 | A | | 6/1998 | Florent |
| 5,861,871 | A | * | 1/1999 | Venable ........................ 708/200 |
| 6,167,167 | A | | 12/2000 | Matsugu et al. |
| 6,256,411 | B1 | | 7/2001 | Iida |
| 6,337,925 | B1 | | 1/2002 | Cohen |
| 6,400,831 | B2 | | 6/2002 | Lee et al. |
| 6,456,297 | B1 | | 9/2002 | Wilensky |
| 6,546,117 | B1 | | 4/2003 | Sun et al. |
| 6,674,955 | B2 | | 1/2004 | Matsui et al. |
| 6,728,421 | B2 | * | 4/2004 | Kokemohr ..................... 382/284 |
| 6,778,690 | B1 | | 8/2004 | Ladak et al. |
| 6,943,809 | B2 | * | 9/2005 | Dermer .......................... 345/621 |
| 6,983,081 | B2 | | 1/2006 | Chen |
| 7,024,039 | B2 | | 4/2006 | Simard et al. |
| 7,245,766 | B2 | | 7/2007 | Brown et al. |
| 7,400,767 | B2 | | 7/2008 | Slabaugh et al. |
| 7,430,339 | B2 | | 9/2008 | Rother et al. |
| 8,004,536 | B2 | | 8/2011 | Wilensky |
| 8,175,409 | B1 | | 5/2012 | Wilensky |
| 2002/0118875 | A1 | * | 8/2002 | Wilensky ....................... 382/173 |
| 2002/0130908 | A1 | | 9/2002 | Wilensky |
| 2002/0136453 | A1 | | 9/2002 | Aggarwal et al. |
| 2003/0026479 | A1 | | 2/2003 | Thomas et al. |

(Continued)

FOREIGN PATENT DOCUMENTS

| | | |
|---|---|---|
| EP | 1720128 A2 | 11/2006 |
| WO | WO-9847146 A1 | 10/1998 |

(Continued)

OTHER PUBLICATIONS

"Adobe Photoshop CS: The New Color Replacement Tool", The National Association of Photoshop Professionals, (2004), 1-4.

(Continued)

*Primary Examiner* — Alex Liew
(74) *Attorney, Agent, or Firm* — Schwegman Lundberg Woessner P.A.

(57) ABSTRACT

A method includes receiving a selection input to define a selection mask with respect to digital data. The selection input is used to generate the selection mask with respect to the digital data. An icon is automatically associated with the selection mask, the icon being selectable to select the selection mask.

17 Claims, 13 Drawing Sheets

(56) References Cited

U.S. PATENT DOCUMENTS

| | | | |
|---|---|---|---|
| 2003/0063794 A1* | 4/2003 | Rubinstenn et al. | 382/154 |
| 2003/0086686 A1 | 5/2003 | Matsui et al. | |
| 2003/0099411 A1 | 5/2003 | Kokemohr | |
| 2003/0202697 A1 | 10/2003 | Simard et al. | |
| 2003/0202699 A1 | 10/2003 | Simard et al. | |
| 2004/0037476 A1 | 2/2004 | Chen | |
| 2005/0025320 A1 | 2/2005 | Barry | |
| 2006/0053374 A1 | 3/2006 | Wilensky | |
| 2006/0204056 A1* | 9/2006 | Steinberg et al. | 382/118 |
| 2008/0069474 A1 | 3/2008 | Tighe | |
| 2008/0131010 A1 | 6/2008 | Wilensky | |

FOREIGN PATENT DOCUMENTS

| | | | |
|---|---|---|---|
| WO | WO-0186375 A3 | 11/2001 | |
| WO | WO-2004031991 A1 | 4/2004 | |
| WO | WO-2006028460 A2 | 3/2006 | |
| WO | WO-2006028460 A3 | 3/2006 | |
| WO | WO-2008070450 A2 | 6/2008 | |
| WO | WO-2008070450 A3 | 6/2008 | |

OTHER PUBLICATIONS

U.S. Appl. No. 10/984,465, Advisory Action mailed Apr. 3, 2009, 3 pgs.
U.S. Appl. No. 10/984,465, Final Office Action mailed Feb. 18, 2010, 15 pgs.
U.S. Appl. No. 10/984,465, Final Office Action mailed Dec. 23, 2008, 16 pgs.
U.S. Appl. No. 10/984,465, Non-Final Office Action mailed Jun. 23, 2008, 15 pgs.
U.S. Appl. No. 10/984,465, Non-Final Office Action mailed Jul. 13, 2009, 16 Pgs.
U.S. Appl. No. 10/984,465, Response filed Mar. 23, 2009 to Final Office Action mailed Dec. 23, 2008, 22 pgs.
U.S. Appl. No. 10/984,465, Response filed Apr. 19, 2010 to Final Office Action mailed Feb. 18, 2010, 25 pgs.
U.S. Appl. No. 10/984,465, Response filed Oct. 15, 2008 to Non-Final Office Action mailed Jun. 23, 2008, 28 pgs.
U.S. Appl. No. 10/984,465, Response filed Nov. 13, 2009 to Non Final Office Action mailed Jul. 13, 2009, 25 pgs.
U.S. Appl. No. 11/633,061, Response filed Dec. 5, 2011 to Non Final Office Action mailed Sep. 16, 2011, 13 pgs.
U.S. Appl. No. 11/633,061, Examiner Interview Summary mailed Mar. 10, 2010, 3 pgs.
U.S. Appl. No. 11/633,061, Non Final Office Action mailed Sep. 16, 2011, 11 pgs.
U.S. Appl. No. 11/633,061, Non Final Office Action mailed Dec. 8, 2010, 13 pgs.
U.S. Appl. No. 11/633,061, Non-Final Office Action mailed Jun. 23, 2010, 11 pgs.
U.S. Appl. No. 11/633,061, Notice of Allowance mailed Jan. 5, 2012, 9 pgs.
U.S. Appl. No. 11/633,061, Response filed Mar. 12, 2010 to Examiner Interview Summary mailed Mar. 10, 2010, 1 pg.
U.S. Appl. No. 11/633,061, Response filed Mar. 8, 2011 to Final Office Action mailed Dec. 8, 2010, 14 pgs.
U.S. Appl. No. 11/633,061, Response filed Sep. 20, 2010 to Non Final Office Action mailed Jun. 23, 2010, 16 pgs.
U.S. Appl. No. 11/633,061, Response to Restriction Requirement mailed Apr. 21, 2010, 15 pgs.
U.S. App. No. 11/633,061, Restriction Requirement mailed Feb. 25, 2010, 8 pgs.
U.S. Appl. No. 11/633,061, Restriction Requirement mailed Apr. 21, 2010, 8 pgs.
U.S. Appl. No. 11/633,062, Examiner Interview Summary mailed Apr. 13, 2011, 1 pg.
U.S. Appl. No. 11/633,062, Final Office Action mailed May 12, 2010, 21 pgs.
U.S. Appl. No. 11/633,062, Non Final Office Action mailed Nov. 24, 2010, 22 pgs.
U.S. Appl. No. 11/633,062, Non-Final Office Action mailed Jan. 8, 2010, 17 pgs.
U.S. Appl. No. 11/633,062, Notice of Allowance mailed Apr. 13, 2011, 10 pgs.
U.S. Appl. No. 11/633,062, Response filed Feb. 14, 2011 to Non Final Office Action mailed Nov. 24, 2010, 14 pgs.
U.S. Appl. No. 11/633,062, Response filed Nov. 18, 2009 to Restriction Requirement mailed Nov. 4, 2009, 13 pgs.
U.S. Appl. No. 11/633,062, Response filed Apr. 8, 2010 to Non Final Office Action mailed Jan. 8, 2010, 18 pgs.
U.S. Appl. No. 11/633,062, Response filed Aug. 12, 2010 to Final Office Action mailed May 12, 2010, 14 pgs.
U.S. Appl. No. 11/633,062, Restriction Requirement mailed Nov. 4, 2009, 4 Pgs.
"At a Glance", Adobe Photoshop CS with Adobe ImageReady CS, (2003), 1-2.
"Color Replacement: Photoshop CS", PSDesigns v.3.0 Heathrowe.com, 1-4.
"Digital Photography Review", Adobe Photoshop CS Review p. 1 Operation, (Sep. 2003), 1-3.
"Digital Photography Review", Adobe Photoshop CS Review p. 2 Operation, 1-3.
"Digital Photography Review", Adobe Photoshop CS Review p. 3 Operation, 1-3.
"Digital Photography Review", Adobe Photoshop CS Review p. 4 Operation, 1-3.
"Entensis Mask Pro 3 Users Guide", (2003), 1-53.
"Evaluation Guide", Extensis, Mask Pro 3, Unmatched Masking Power and Precision, (2003), 1-29.
"Getting Started with Adobe Photoshop 6.0", ITS Training, Short Course, (Sep. 27, 2001), 1-18.
"How to Fix Red Eye", Adobe Photoshop CS with Adobe ImageReady CS, Adoce Photoshop CS Help, 1.
"Image Enhancement—Understanding the Basics of Photoshop", UPENN, Department of City & RegionalPlanning, Planning Support System, Fall 2003, (2003), 1-24.
International Application Serial No. PCT/US04/29149, International Search Report mailed Mar. 23, 2006, 4 pgs.
International Application Serial No. PCT/US04/29149, Written Opinion mailed Mar. 23, 2006, 6 pgs.
International Application Serial No. PCT/US2007/085244, International Search Report and Written Opinion mailed Mar. 4, 2009, 12 pgs.
International Application Serial No. PCT/US2007/085244, Written Opinion mailed Mar. 4, 2009.
Japanese Application Serial No. 2007-529800, Office Action mailed Mar. 2, 2010, 2 Pgs.
"Photoshop—Layer Basics", Adobe Photoshop, 1-8.
"The Professional Standard in Desktop Digital Imaging", Adobe Photoshop cs, Features, (Sep. 2003), 1-6.
"Unmatched Masking Power & Precision", Extensis Masko Pro 3; more Control and Precision for Unmatched Masking Results, (2003), 1.
"Using Layer Comps", Adobe Photoshop CS, Tutorial, (2003), 1-2.
"Using the Color Replacement Tool", 1-2.
"Using the Healing Brush tool (Photoshop)", 1-2.
"Working with Selections", Adobe Photoshop 5.0, Tutorial excerpted from Adobe Photoshop Classroom in a Book, (1998), 1-14.
Boykov, Y, et al., "Interactive graph cuts for optimal boundary & region segmentation of objects in N-D images", Eighth IEEE International Conference on Computer Vision, 2001. ICCV 2001. Proceedings., (2001), 105-112.
Comaniciu, Dorin, et al., "Kernel-Based Object Tracking", 2000 IEEE Conference on Computer Vision and Pattern Recognition., 1-30.
Comaniciu, Dorin, et al., "Robust detection and tracking of human faces with an active camera", Third IEEE International Workshop on Visual Surveillance, 2000. Proceedings., (2000), 11-18.
Comanisiu, Dorin, et al., "Real-Time Tracking of Non-Rigid Objects using Mean Shift", Proceedings. IEEE Conference on Computer Vision and Pattern Recognition, 2000., 1-8.

(56) References Cited

OTHER PUBLICATIONS

Geman, S, et al., "Stochastic Relaxation, Gibbs Distributions, and the Bayesian Restoration of Images", IEEE Transactions on Pattern Analysis and Machine Intelligence, vol. PAMI-6, No. 6, (Nov. 1984), 721-741.

Kelby, Scott, "Retouching Tips: Enhancing Eyes, Eyelashed, and More!", Adobe Photoshop CS, Tutorial, (2003), 1-3.

Kohli, P, et al., "Efficiently solving dynamic Markov random fields using graph cuts", Tenth IEEE International Conference on Computer Vision, 2005. ICCV 2005., 922-929.

Lombaert, H, et al., "A multilevel banded graph cuts method for fast image segmentation", Tenth IEEE International Conference on Computer Vision, 2005, ICCV 2005., 259-265.

Mortensen, E N, et al., "Interactive segmentation with intelligent scissors", Graphical Models and Image Processing, 60, (1998), 349-384.

Reese, L J, "Intelligent paint: Region-based interactive image segmentation", Master's thesis, Brigham Young University, (1999), 1-142.

Rother, Carsten, et al., "GrabCut—Interactive Foreground Extraction using Iterated Graph Cuts", ACM Transactions on Graphics, 23(3), (2004), 309-314.

Tan, K. H, et al., "Selecting Objects with freehand sketches", Proceedings of the eigt IEEE International Conference on computer vision;vol. 1, (Jul. 7, 2001), 337-344.

Wang, A, et al., "On fast FIR filters implemented as tail-canceling IIR filters", IEEE Transactions on [see also Acoustics, Speech, and Signal Processing, IEEE Transactions on] Signal Processing, 45(6), (Jun. 1997), 1415-1427.

Wang, J, et al., "An iterative optimization approach for unified image segmentation and matting", Tenth IEEE International Conference on Computer Vision, 2005. ICCV 2005., 936-943.

Yahia, H. M, et al., "Fast & robust level-set segmentation of deformable structures", Acoustics, Speech and signal processing, 1998. Proceedings of the 1998 IEEE International Conference on Seattle. vol. 5, (May 12, 1998), 2765-2768.

"U.S. Appl. No. 10/984,465, Advisory Action mailed May 3, 2010", 3 pgs.

"U.S. Appl. No. 10/984,465, Appeal Brief filed Sep. 20, 2010", 39 pgs.

"U.S. Appl. No. 10/984,465, Decision on Pre-Appeal Brief Request mailed Aug. 20, 2010", 2 pgs.

"U.S. Appl. No. 10/984,465, Examiner's Answer to Appeal Brief mailed Dec. 9, 2010", 17 pgs.

"U.S. Appl. No. 10/984,465, Pre-Appeal Brief Request filed May 18, 2010", 5 pgs.

"U.S. Appl. No. 11/633,062, Examiner Interview Summary mailed Feb. 22, 2011", 3 pgs.

* cited by examiner

COHERENT IMAGE MODIFICATION

CROSS-REFERENCE TO RELATED APPLICATIONS

This application is a continuation application of U.S. patent application Ser. No. 11/633,061, filed Dec. 1, 2006 and entitled "COHERENT IMAGE SELECTION AND MODIFICATION," which is incorporated herein by reference in its entirety.

FIELD OF TECHNOLOGY

The present application relates generally to the technical fields of computer graphics processing, operator interface processing, and selective visual display systems and, in one example embodiment, to methods and systems to perform an automated selection (e.g., mask definition) with respect to digital data.

BACKGROUND

The performance of activities (e.g., adjustments, modifications, editing, etc.) related to digital data is facilitated by many existing editing tools. Take, for example, the process of modifying a digital image by a user utilizing an image editing application. The user typically makes global image adjustments (e.g., the overall lighting and color balance of the global image is modified), whereafter the user may modify local regions of the digital image. After a global adjustment has been made, one object (or feature) of the image may be too dark and need to be lightened. A face of a person appearing in the digital image may be too saturated, or the user may desire to change the color hue of a flower, for example, from red to pink or purple. To make such local adjustments typically requires a two-step process. First, the user makes a selection of the relevant object, utilizing or more selection (or segmentation) tools, and then applies an image adjustment to a selected region of the digital image. In the event that the resultant image is not what the user desires, the user is required to undo the effect and redo the selection. It will be appreciated that this may be a somewhat slow and tedious process. Further, the region selection process (e.g., painting the selected region) can be time consuming and inaccurate.

One example of an image editing application is the ADOBE® PHOTOSHOP® image editing application, developed by Adobe Systems Incorporated of San Jose, Calif. The ADOBE® PHOTOSHOP® application provides a feature called the Color Replacement Brush, which allows a user to create and save constant "brushes" with precise settings, including size, shape, tilt, spacing, scatter, jitter, etc. However, once an image region has been brushed, an image modification is fixed and parameters that went into creating the modification cannot be changed without undoing and redoing the brush stroke. The ADOBE® PHOTOSHOP® application further provides a Replace Color Adjustment feature. This feature is, however, limited to a global color range selection.

The ADOBE® PHOTOSHOP® application further provides so-called "Adjustment Layers," which enable localized adjustments of an image. However, the Adjustment Layers require a user manually to create a selection mask, and the updating of this mask is a multi-step process.

Current methods for the automated (or partially automated) definition of a selection mask may require efficient segmentation on an image, and tended to suffer from a number of technical deficiencies. For example, current selection technologies may inaccurately select objects within an image, or alternatively require a large degree of manual input in order to accurately identify and select an object within an image. Examples of current selection technologies include the "Magic Wand" and "Magnetic Lasso", both present in the ADOBE® PHOTOSHOP® application. The "Magic Wand" technology starts with a user-specified point or region to compute a region of connected pixels, such that all of the selected pixels fall within some adjustable tolerance of the color statistics of the specified region. Determining an acceptable tolerance tends to be difficult for a user. For example, because the distribution of color space of foreground and background pixels may have considerable overlap, satisfactory segmentation may be difficult to achieve utilizing the "Magic Wand" technology.

While the "Magic Wand" technology utilizes texture (or color) information to perform segmentation, the "Magnetic Lasso" technology uses edge (or contrast) information to perform segmentation. For example, a user may be allowed to trace an object's boundary with a mouse. However, often many user interactions are necessary to obtain a satisfactory result.

Further, once multiple segmentations have been performed with respect to a digital image in order to define multiple selection masks, the identification, modification and interactions between such selection masks present both a number of usability and technical challenges. Amongst these challenges is the presentation of information to a user that allows the user conveniently to identify, select and manipulate a specific selection mask where a number of selection masks are applicable with respect to a particular digital image. Another example challenge is the processing of image adjustments, where different image adjustments are associated with each of a number of potentially overlapping selection masks.

BRIEF DESCRIPTION OF THE DRAWINGS

The embodiments are provided by way of example and not limitation in the figures of the accompanying drawings, in which like references indicate similar elements and in which.

DETAILED DESCRIPTION

Figure 1:
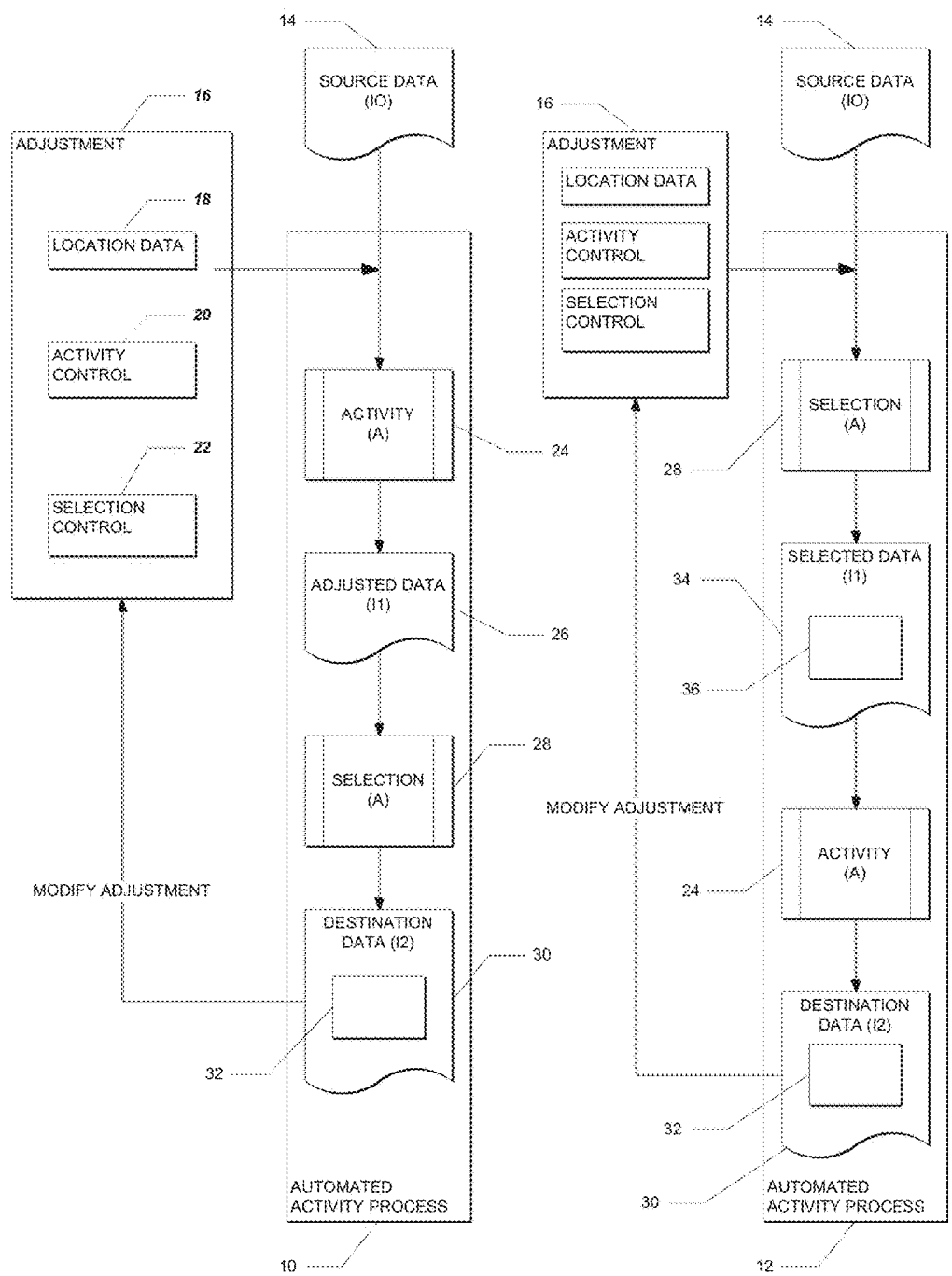
FIG. 1 is a flow diagram, illustrating performance of an activity, in an example form of an adjustment, to source data in a localized manner to generate destination data, according to two example embodiments.

Method and systems to perform digital data (e.g., image data) segmentation and localized activities with respect to segmented digital data are described. In the following description, for purposes of explanation, numerous specific details are set forth in order to provide a thorough understanding of the described embodiments. It will be evident, however, to one skilled in the art that the present inventions may be practiced without these specific details.

An example embodiment seeks to provide systems and methods to enable a user to perform segmentation and selection of a portion of source digital data (e.g., vector-based or non-vector based graphics or art), and to perform a multitude of activities (e.g., image adjustments) with respect to the portion of source digital data. The user may have parametric control of both (1) the activity and (2) the segmentation of the source digital data and selection of the portion of the source digital data to which the activity is applied. Further, one example embodiment seeks to provide near real-time feedback (e.g., visual feedback) regarding the results of the parametrically-controlled activity. In other words, the effects of the activity may be communicated or observable by a user in a near real-time or "live" manner. Further, an embodiment seeks to enable a user interactively to modify parameters associated with the activity and/or the selection, so as to provide output to the user, in near real-time, showing the effects of such modifications to the activity or selection parameters.

In one example embodiment, the markers are generated automatically. In this embodiment, a "brush tool" is used to mark the image and provide a live interactive coherent selection mask as the user brushes (e.g., with a computer mouse for example) over the image. Upon release of the brush (e.g., a mouse up event), a selection marker is automatically placed on a location in the selection mask. The location is chosen to be close to the centroid of the mask, in a region in which the mask values are high (e.g., indicative of selection of foreground regions). Selections markers may be automatically placed near the centroid of each adjusted region. If the region consists of unconnected pieces, then a separate marker may be placed in each such piece. For each connected region, the marker may placed at a location in the image which lies within the region and is as close as possible to the centroid of the region and does not overlap another marker.

In one example embodiment, an effective selection mask is derived from the set of input locations identified by a user relative to the source digital data (e.g., image data). This may be achieved by using each location to set local energy values for each pixel that lies close to the location and within a predetermined area (e.g., sphere, circle or rectangle) of influence. The area of influence may also encompass a full image area. Image data (e.g., color, opacity) values determine a neighbor interaction energy that produces a spatial coherence in the resulting selection. The energy of a particular pixel may also depend on the selection state of that pixel (e.g., selected or not selected). The selection state may be solved through energy minimization with respect to the image data (e.g., by finding that state for pixels in a particular space, which results in the lowest overall energy value). Graph-cut methods may, in one example embodiment, be used to perform energy minimization.

The "brush tool" may also enable controlled adjustments to portions of an image as the user brushes over an image. These adjustments may be editable, both with respect to the region or portion of the image affected by the adjustment, and the parameters of the adjustment itself. In one embodiment, the selection and adjustment may be a one step process, in that as a user brushes over an image to perform a selection, image adjustments are performed in a contemporaneous manner. In other words, the selection, and associated adjustment, may automatically flow to object boundaries in response to a user's strokes or brush movements over an image. Accordingly, this may provide a "live" application of an adjustment, in that the adjustment is applied as the user brushes. This live feedback may provide an intuitive feel, and ease use and control.

In an example embodiment, a user may perform at least the two operations, namely (1) a "painting" of new adjustments; and (2) selecting of an existing "adjustment" (e.g., a selection mask and associated adjustment functions) to change by either by (a) changing one or more adjustment parameters and being presented with resulting image modifications, or (b) to modify an adjustment to a region by brushing or some other user input operation.

Upon a first application, in an example embodiment, of a "local adjustment" brush with respect to a specific image, a new adjustment (e.g., a selection mask and associated adjustment parameters) may be created. Subsequent to the creation of the new adjustment, a default mode of operation may be to modify this existing adjustment responsive to user input, as long as the adjustment parameters associated with the adjustment are not changed. However, as soon as an adjustment parameter is changed, then subsequent brush strokes by the "local adjustment" brush may result in the creation of a new adjustment. In this way, each time an adjustment parameter is changed, yet another adjustment may be automatically created. Creating an "adjustment", in an example embodiment, may involve the creation of a selection with respect to digital data (e.g., the identification of a region with respect to a digital image) to which specific adjustment parameters are attached (e.g., exposure=+1, contrast=−3, etc.). The attached (or associated) parameters may be those in effect prior to application of the relevant "local adjustment" brush.

A user may further modify an area or a region of digital data of application of an existing adjustment by moving a selection tool (e.g., identified by a cursor icon) to the desired area, and performing some selection operation (e.g., double clicking or right clicking using a mask). If multiple adjustments have been applied to a pixel selected by the tool, then the selection operation may invoke a menu or other presentation of the multiple adjustments. The user may then be enabled to select from the menu or a selection of adjustments. In one example embodiment, the menu may provide feedback to a user regarding the nature of each adjustment. For example, for each adjustment, the menu may present a thumbnail of the image, masked out by the appropriate adjustment mark and cropped to the boundaries of the adjustment.

When receiving a selection from such a menu of adjustments, a user interface may also show a broken line (e.g., "marching ants") boundaries around the associated adjustment regions in the image, in order to provide a further identification of the adjustment region to a user.

Each menu entry within a menu of adjustments may also include some indication of the nature of the relevant adjustment. For example, if an adjustment operates to brighten an image and make it bluer, a thumbnail image icon can be shown, one part of which may be brighter and bluer than the other.

In a further embodiment, a further selection operation (e.g., double clicking) default operation may be invoked to select the latest adjustment to effect the relevant pixel, or to select an adjustment which has the smallest area, or meet some other defined criteria. Subsequent selection operations (e.g., double clicks) may toggle through the menu (or list) of adjustments, showing borders (e.g., as broken lines or marching ants) around each adjustment area within the digital data.

In a further embodiment, in addition to enabling selection of an existing adjustment by way of selection operation (e.g., a right click or a double click), icons or markers may be overlaid on an image which are placed near the "center of mask" of each of the separate adjustments. User selection of the relevant icon or marker may provide one manner in which a user may conveniently select an adjustment. Furthermore, a user is presented with the option of activating or deactivating the presentation of such markers.

User selection of an adjustment, utilizing any of the methods discussed above, may result in an image adjustment application or tool being placed in a mode that is geared for modifying the adjustment regional parameters. If a user then elects to modify a parameter value, the targeted adjustment may be shown with a new value applied. Likewise, if a user chooses to modify the selection area (e.g., by performing a further brush operation), then the targeted adjustment is modified by the brush using a current parameter setting. Furthermore, once the brush is then deactivated, the tool may revert to its normal brushing mode, in which certain parameter settings may be chosen by a user and the settings then used in the new brush strokes, without affecting previous brush strokes.

As noted above, an embodiment seeks to enable the performance of a number of localized activities with respect to source digital data. Accordingly, location data (e.g., associated with one or more activity icons, markers or pins) may allow a user to specify a number of locations with respect to source digital data at which various activities (e.g., selective adjustments) are to be applied. Further, the activity markers may specify both the activity type, and also parametrically control the degree (or extent) of effects that result from the selected activity. For example, the degree (or extent) of activity may be controlled as to locality, both in a coordinate space and a color space, with respect to digital image data.

Further, one embodiment allows a user to modify the controls associated with a particular activity icon, marker or pin and the parametrically-controlled portion of the source digital data, to provide a user with near real-time feedback (e.g., visual or otherwise).

In one embodiment, an activity marker may furthermore have a "polarity" associated therewith, and a user may be enabled to switch a polarity from positive to negative, or vice versa. A "positive" marker, in one embodiment, may identify a portion that positively contributes towards the definition of a selection mask, while a "negative" marker may negatively contribute (or subtract) from a selection mask. Consequently, in one embodiment, combinations of positive and negative markers may be utilized to create a refined composition selection mask, or to refine the portion of the digital data to which the activity is applied.

The activity markers, utilizing an associated collection of selection controls, provide a mechanism for performing segmentation of the source digital and selection of a portion (e.g., region) of the source data, in one embodiment, based on proximity to location data for an activity marker (e.g., a spatial profile of the activity marker). A user, by locating multiple activity markers with respect to source digital data, can specify an accumulation of activities to be performed with the respect to the source digital data, with each of these activities being parametrically localized in accordance with appropriate selection controls associated with each of the activity markers.

Further, in one example embodiment, an activity layer is provided (e.g., as part of a digital data activity application), the activity layer being distinct from the source digital data and operatively serving to modify a representation of the source digital data. As the activity layer is distinct from the source digital data, an activity layer enables a digital data activity application to modify a representation of the source digital data in a non-destructive manner. Further, in one embodiment, a digital data activity application may enable a user to create a multitude of activity layers that may be "superimposed" so as to create an accumulation of parametrically selected portions of a source digital data and/or an accumulation of parametrically-controlled activities with respect to the source digital data.

Certain activity markers, in one example embodiment, may be equipped with sensing logic so as to enable the activity markers to identify certain characteristics of source digital data at locations associated with the activity markers (e.g., at locations on digital image data at which the markers have been placed by a user). The sensing logic may, responsive to the detection of a predetermined characteristic, automatically invoke certain predetermined activities with respect to the selected portion of the source digital data associated with the activity marker. For example, where the source digital data is digital image data, an activity marker may automatically determine whether a location, associated with the marker in the digital image data, is in shadow or in highlight. Depending on this determination, a parametrically-controlled adjustment with respect to a selected portion of the digital image data may be performed.

Further, in one embodiment, a predefined (or default) set of activity markers may furthermore be provided within the context of a digital data activity application, the predefined activity markers including selection and activity controls, and associated parameters, which are pre-configured to perform certain activities. Again, considering an example where the source digital data is digital image data, a "bluer-sky" marker may be defined automatically to enhance the blue color of the sky when associated with a portion of digital image data representing the sky. Similarly, a "greener-tree" marker may be provided by a digital image adjustment application. The digital image adjustment application may also enable a user to modify parameters, associated with the selection and activity controls.

FIG. 1 is a block diagram illustrating automated processes 10 and 12, according to respective example embodiments, for the performance of one or more localized activities with respect to source digital data 14. In a first embodiment, the source digital data 14 and a marker 16 provide input to an automated activity process 10. The marker 16 includes location data 18, identifying one or multiple locations (e.g., a series of locations indicated by a brush stroke) in the source digital data 14, an activity control 20 specifying an activity type and associated activity parameters, and a selection control 22 specifying a selection type and associated parameters. The activity process 10 is shown to perform an activity process 24 (e.g., image adjustment) with respect to the source digital data 14, in accordance with the activity control 20, to generate adjusted data 26. A selection process 28, to define a selection mask, is also performed. Effects of the activity process 24 are then localized utilizing the selection mask to generate destination data 30. Specifically, the effects of the activity process 24 are localized, by the selection mask, to a selected portion 32 of the destination data 30. The marker 16 may then optionally be modified (e.g., any of the location data 18, activity control 20 or selection control 22 may be modified) by a user or an automated process to invoke a further iteration of the automated activity process 10.

The second example automated activity process 12 differs from the process 10 in that a selection process 28 precedes the activity process 24. Accordingly, the selection process 28 is shown to generate a selection mask that identifies a selected portion 36. The activity process 24 is then applied with respect to the selected portion 36, thereby to generate destination data 30, in which the effects of the activity process 24 are localized to a selected portion 32. Again, the marker 16 may be modified to invoke a further iteration of the automated activity process 12.

Figure 2:
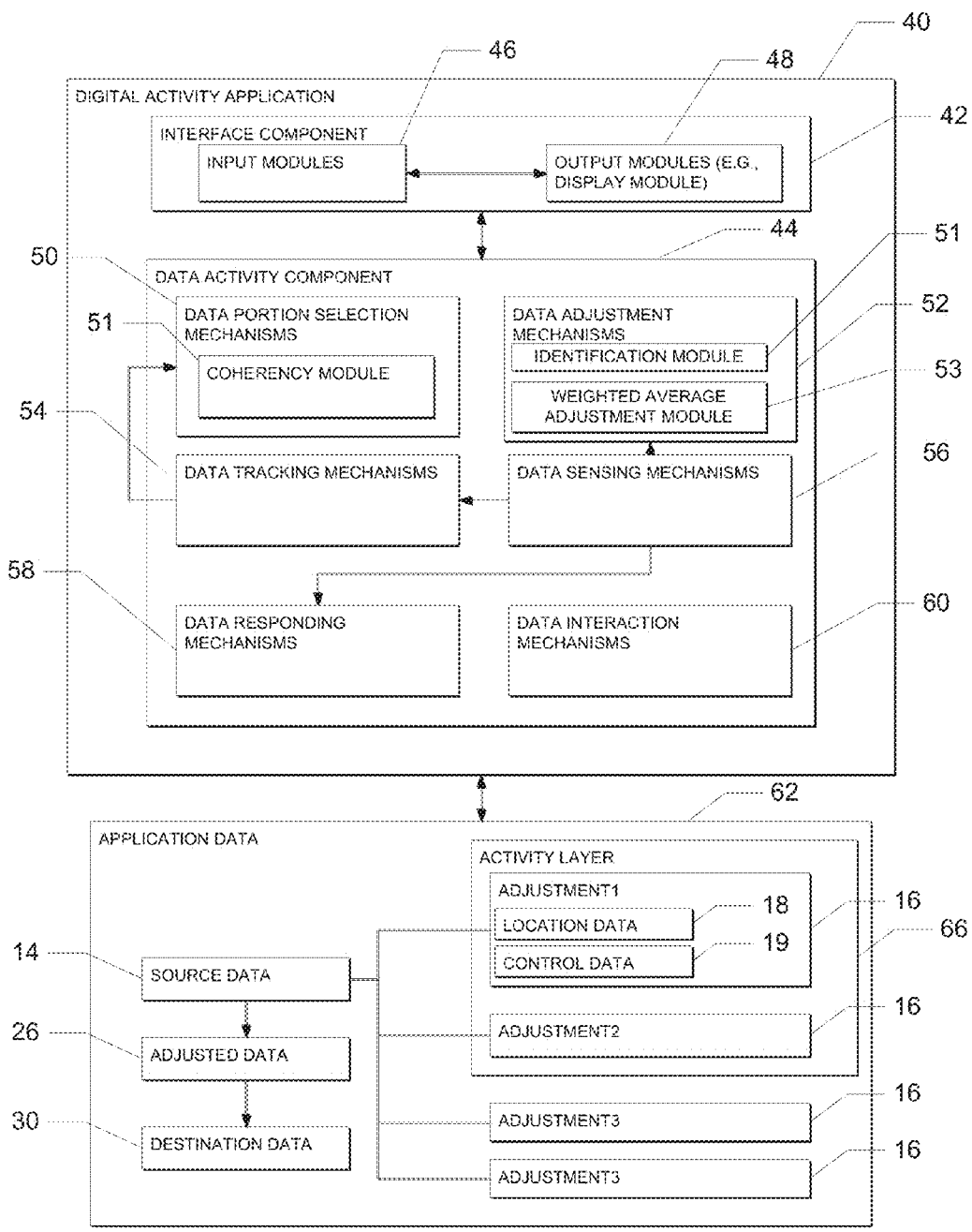
FIG. 2 is a block diagram illustrating an architecture of a digital data activity application, and associated application data, according to an example embodiment.

FIG. 2 is a block diagram illustrating an example system, in the form of a digital data activity application 40, to perform a localized activity with respect to digital data. The digital data activity application 40 may, for example, comprise a photo editing application (e.g., ADOBE® PHOTOSHOP® or IPHOTO®), a video editing application (e.g., ADOBE® AFTER EFFECTS® or IMOVIE®), an audio processing application (e.g., ADOBE® AUDITION®, or ITUNES®), or a document processing application (e.g., ADOBE® ACROBAT® or a MICROSOFT WORD®). The digital data activity application 40 is described below as including a number of modules, components or mechanisms. A module, component or a mechanism may be a unit of distinct functionality that can provide information to, and receive information from, other modules. Modules, components or mechanisms may facilitate communication with input or output devices, and can operate on a resource (e.g., a collection of information).

The activity application 40 includes (1) an interface component 42 and (2) a data activity component 44. The interface component 42 operates to receive input from, and to provide output to, a user of the activity application 40, and/or to other systems and applications. To this end, the interface component 42 includes one or more input modules 46 to receive source digital data 14 from a device or system (e.g., an audio input device, a digital camera, a video camera, a disk drive etc). The input module 46 also enables the activity application 40 to receive input, via a user interface, from a user. For example, the input module 46 enables a user to input location data 18, specifying a location with respect to source digital data 14.

The interface component 42 also includes one or more output modules 48 to provide output to one or more external devices or systems (e.g., a display device, an audio reproduction device, or a disk drive).

The data activity component 44 is shown to include selection logic, in the example form of one or more data portion selection mechanisms 50, and multiple instances of activity logic. In the example embodiment, the activity logic may include data adjustment mechanisms 52, data tracking mechanisms 54, data sensing mechanisms 56, data responding mechanisms 58 and data interaction mechanisms 60, each of these mechanisms 52-60 operating to perform a specific activity with respect to source digital data 14. The effects of these activities are localized utilizing the data portion selection mechanisms 50, which create a selection mask in terms of which the effects of the activities may be localized. These selection mechanisms 50 are shown to include, among other modules, a coherency module 51 that uses a coherent classification methodology to segment source digital data 14 as part a selection process.

Coherent classification may be regarded as a data item (e.g., pixel) classification technique that uses an objective cost function with two types of costs, namely regional costs and boundary costs. For example, with respect to pixels, a regional cost may reflect the cost of labeling a particular pixel as foreground or background. A boundary cost may reflect the cost of labeling a pair of neighboring pixels as both foreground, both background, or one each foreground and background. The boundary cost of labeling a pair of pixels with different classifications is high when two pixels have a similar color, since it is likely that pixels with a similar color would either be both in the selection or not. Regional costs may typically be determined by comparing the color of a given pixel to a model of colors expected in the foreground or the background. Regional costs may also be assigned piecewise constant values, with distinct values being given to known foreground, known background, and unknown data items. Generally, this model is derived from the selected pixels provided by the user. Coherent classification may be determined by finding a labeling of pixels (e.g., either as foreground or background, or as included or excluded from a selection) that minimizes a cost function constrained by user-selected pixels within an image. Such a cost minimization function may be solved, in an example embodiment, as a minimum graph cut problem, or its equivalent namely a maximum graph flow problem. Further details regarding an example method of performing coherent classification with respect to image data are provided in co-pending U.S. application Ser. No. 11/517,189 entitled, "LIVE COHERENT IMAGE SELECTION," filed on Sep. 6, 2006.

At a high level, the data adjustment mechanisms 52 may perform one or more adjustments (or modifications) to a selected portion of the source digital data 14. Before discussing the various example mechanisms 52-60 in further detail, it is useful to consider the application data 62 that constitutes input to, and is generated as output by, the activity application 40. Specifically, the application data 62 is shown to include the source digital data 14, the adjusted data 26 (which constitutes an intermediate output of the activity application 40) and the destination data 30 (which constitutes output of the activity application 40). A collection of activity markers 16 may be associated with each instance of source digital data 14, each marker 16 including location data 18 and control data 19. The location data 18 include a marker origin (r0) that identifies a location (e.g., a two-dimensional or three-dimensional image coordinate) with respect to the source digital data 14. The location data 18 may also identify multiple locations with respect to the source data.

The control data 19 may identify one or more data portion selection mechanisms 50, in embodiments where multiple selection mechanisms are included.

The control data 19 may identify one or more adjustment mechanisms 52 that are associated with the marker 16 (e.g., color or lighting adjustment mechanisms), as well as parameters that control the operational functioning of the identified adjustment mechanisms 52

In one embodiment, the association between each of the markers 16 and the source digital data 14 is user-created, as a result of input received from a user via the interface component 42 (e.g., a brush stroke or "pin" placement). However, certain markers 16 may be automatically instantiated, and associated with source digital data 14, as a result of activities performed by the data sensing and/or data responding mechanisms 56 and 58.

A subset of the markers 16 may furthermore be associated with an activity layer 66, as will be further described below.

Returning to the activity logic, the data adjustment mechanisms 52 may include a collection of mechanisms, identifiable by control data 19 of a marker 16, which perform adjustment operations with respect to the source digital data 14. The types of adjustment may depend on the types of digital data with respect to which the activity application 40 is adapted to perform activities. For example, where the activity application 40 is an image editing application, the data adjustment mechanisms 52 may specify a number of image adjustment operations. Where the activity application 40 is an audio or video editing application, the adjustment mechanisms 52 will similarly be suited to adjusting these data types.

The data tracking mechanisms 54, which may again be associated with a marker 16 via the location data 18, may operatively track characteristics associated with a particular marker 16, as well as various selection and adjustment characteristics. For example, in an embodiment in which the source digital data 14 comprises digital video data, a tracking mechanism 54 may enable a marker 16 automatically to be relocated with respect to the video data (e.g., as image content, within the video data, moves). In one embodiment, a data tracking mechanism 54 may operatively modify the location data 18 of a marker 16. Accordingly, when a marker 16 is located on particular image feature or object, a data tracking mechanism 54 may provide the capability for that marker 16 to remain associated with the image feature or object as that feature or object moves through a sequence of video frames.

To implement a tracking ability, a tracking mechanism 54 may utilize initial state information (e.g., location data 18 indicating a fixed location). The location data 18 associated with a data tracking mechanism 54 may indicate if the relevant marker 16 is to be fixed at a specific location with respect to the source digital data 14 (e.g., it is to be fixed at an image coordinate (x,y position)). The state is set to "fixed" for an initial video frame, but set to "not fixed" for subsequent video frames, which indicates that the marker 16 is relocatable to track an underlying image, object or feature from the initial fixed frame, or from a previous image frame.

A data tracking mechanism 54 may utilize any one of a number of tracking algorithms described in published literature. For example, in one embodiment, a search window region may be defined around a location, identified by the location data 18. For each of a multitude of locations of a smaller track window, placed within the larger search window region, a "similarity measure" is calculated. The similarity measure quantifies how similar the track window is to an equal size track window placed at the location, identified by the location data 18, in either an initial frame or a previous frame. One such "similarity measure" is the negative of the mean squared difference of pixel intensity value, averaged over all color components. For the multitude of search points, that point which is the most similar (e.g., has the largest "similarity measure") is chosen as the new "tracked location" for the video frame. Accordingly, the location data 18 may then be modified to equal the new tracked location. Accordingly, the marker 16 is moved to the new "tracked location."

*IEEE TRANSACTIONS ON PATTERN ANALYSIS AND MACHINE INTELLIGENCE*, VOL. 25, NO. 5, MAY 2003 *Kernel-Based Object Tracking*. Dorin Comaniciu, Senior Member, IEEE, Visvanathan Ramesh, Member, IEEE, and Peter Meer, Senior Member, IEEE.

If an image in each frame of source video data is first converted to a gradient magnitude image, then the above-described tracking mechanism will be more sensitive to edges in the image. The gradient magnitude can be the root mean square of the result of applying a horizontal Sobel photo and a vertical Sobel filter. Example Sobel filters are more fully described in the following document:

R. Gonzalez and R. Woods, *Digital Image Processing*, Addison Wesley, 1992.

The adjustment parameters of a marker 16 may additionally reference one or more data sensing mechanisms 56. In one embodiment, a data sensing mechanism 56 may enable a marker 16 to "sense" a local environment. For example, where the source digital data comprises video or image data, if the associated marker 16 is placed on an eye, the data sensing mechanism 56 may enable the marker 16 to detect the presence of an eye feature, and respond accordingly. The response may be an alert to a user of the activity application 40 that the marker 16 has been located on an eye, and perhaps that eye correction adjustment (e.g., red eye correction, whitening of cornea, saturating iris, etc.) should be applied. Alternatively, such adjustments may be made automatically. To this end, the data sensing mechanisms 56 are shown to be communicatively coupled to the data adjustment mechanisms 52. In the event that, for example, an eye is detected, the data sensing mechanism 56 may invoke an appropriate image adjustment mechanism 52 in an automated fashion to make an image adjustment.

A further data sensing mechanism 56 may enable a marker 16 to sense when an underlying image, feature or object changes. For example, a data sensing mechanism 56 may retain stored image data from a window around a location identified by the location data 18. The data sensing mechanism 56 may then compare this window to a selected video frame, for example, with corresponding window image data, from a current video frame on which the marker 16 is located. For video data, sensing may consist of measuring the average squared difference according to the following equation:

$$\text{sensation} = \langle [I1(r) - I2(r)]^2 \rangle,$$

where $I1(r)$ is image intensity or color data at location r from one video frame and $I2(r)$ is the data at the same relative location in another frame, and $\langle \ldots \rangle$ indicates an average value taken over all pixels located within the window. In addition to taking the average difference in squared image intensity (e.g., including color) values, the average may incorporate the difference in squared gradient values. This may replace the intensity difference or may supplement it with an associated weight.

The control data 19 of a marker 16 may also associate one or more data responding mechanisms 58 with a particular marker 16. The data responding mechanisms 58 may, as shown in FIG. 2, be communicatively coupled to a data sensing mechanism 56, and receive input from a data sensing mechanism 56. As noted above, for source video data, where a data sensing mechanism 56 detects an image change (e.g., greater than a predetermined threshold), the data sensing mechanism 56 may invoke a response by the marker 16. Such a response, in one embodiment, is provided by one or more data responding mechanisms 58. For example, the response issued by a data responding mechanism 58 may be an alert to the user. Alternatively, the response may be a signal that is sent to the activity application 40, for the purpose of coordinating image modifications. Alternatively, a response signal may be sent as a message (e.g., an e-mail, a phone text message, a phone message, or an electronic message of another sort) directed towards another computer program or device. A data responding mechanism 58 may further send a message to components of another marker 16 that is associated with the subject source digital data 14, or to a marker 16 associated with a different source digital data 14 (e.g., source digital data of a different type).

The control data 19 of a marker 16 may furthermore associate one or more data interaction mechanisms 60 with the relevant marker 16. In one embodiment, the data interaction mechanisms 60 enable multiple markers 16, associated with common or different source digital data 14, to interact. For example, markers 16 may interact to maintain a specified spatial arrangement. Consider an example in which the source digital data 14 is a video data, comprising a video clip monitoring a house. A marker 16 is then located with respect to the video clip. Utilizing an appropriate data sensing mechanism 56, the marker 16 analyzes the image data (or other document data) in the vicinity of a specified location for the purposes of responding in a predetermined manner, as dictated by a data responding mechanism 58. The sensing operation may be to determine if the marker 16 is located on a human face, in which case the marker 16 may set (or select) a data adjustment mechanism 52 to make an appropriate skin tone correction. Similarly, if the marker 16 is located on sky, it may select appropriate "blue sky" adjustment mechanism 52.

In the monitoring example, in the event that the data sensing mechanism 56 of the marker 16 senses a change in local scene content (e.g., notices that the door has been opened), an associated data responding mechanism 58 may be invoked to send a message to other markers 16, associated with the image, or to markers 16 associated with a different video clip. For example, once a specific marker 16 detects that the door has been opened, a marker 16 located near a vault or jewelry box may be instantiated and/or activated to begin sensing operations, utilizing a data sensing mechanism 56, to detect or analyze faces (e.g., black ski masks) within the vicinity, and to generate an appropriate notification (e.g., an e-mail message to a homeowner) or to activate an alarm.

While the mechanisms 52-60 have above been described with reference primarily to video data, it will readily be appreciated that these mechanisms may equally be applied to other types of digital data. For example, the source digital data 14 may be audio data. In this case, one or more data tracking mechanisms 54 may track a specific audio feature or object within the audio data (e.g., a specific voice, instrument, frequency, tone, etc.). Similarly, a data sensing mechanism 56 may operate to sense a particular characteristic of the underlying audio data so as to enable the tracking. The sensing mechanism 56 may also then invoke one or more adjustment mechanisms 52 to adjust a sensed (and possibly tracked) audio feature or object in an underlying audio track. Similarly, a data responding mechanism 58 may provide an alert, or perform some other action, in response to a detected condition. For example, where the audio data comprises surveillance information, a sensing mechanism 56 may be configured to detect the voice of a particular individual. Responsive to detecting such a voice, the data sensing mechanism 56 may invoke a data adjusting mechanism 52 to adjust the audio data (e.g., by enhancing the sensed voice), and may also invoke a data responding mechanism 58 to provide a user with an alert indicating that the relevant voice has been detected.

Figure 3:
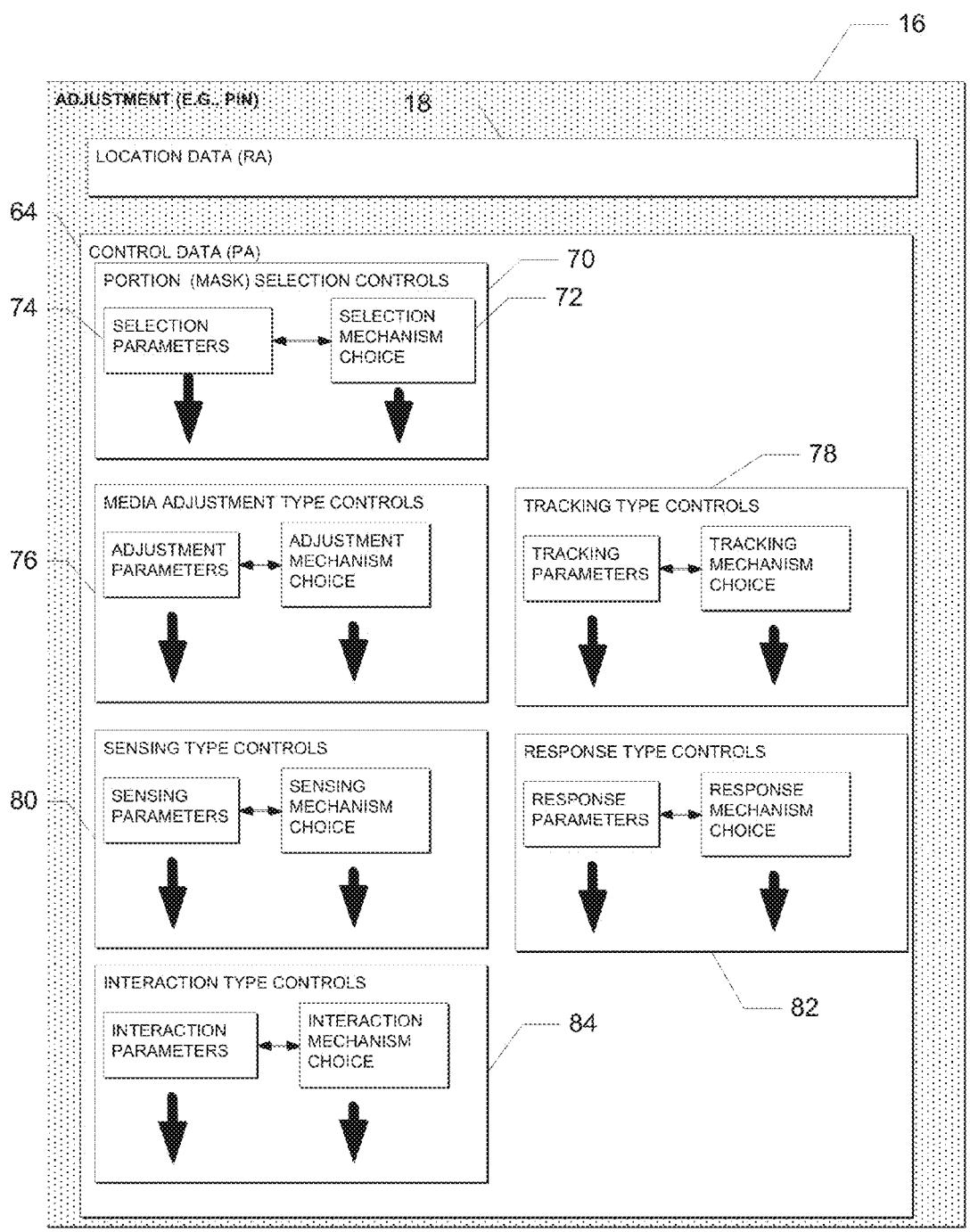
FIG. 3 is a block diagram illustrating a structure of a marker, according to an example embodiment, that has location data and control data associated therewith, the control data including selection controls and various activity controls.

FIG. 3 is a block diagram providing further detail regarding the structure of a marker 16, according to an example embodiment. As mentioned above with reference to FIG. 2, a marker 16 may include location data 18 (e.g., the marker origin (r0)), the value of which identifies a location within source digital data 14 with which the marker 16 has been associated either by a user or an automated process (e.g., by a data sensing mechanism 56). The marker 16 is also shown to include control data 19, which includes one or more of the controls. The example marker in FIG. 3 is shown to include (1) portion (or mask) selection controls 70, which include a selection mechanism choice 72 (e.g., the identification of one of a number of data portion selection mechanisms 50 supported by the activity application 40), and (2) one or more selection parameters 74 associated with the selection mechanism choice 72. The data portion selection mechanism 50, identified by the selection mechanism choice 72, utilizes the selection parameters 74 in order to perform a parametrically-controlled selection of a portion of the source digital data 14 to which the effects of one or more activities are to be localized.

In an example embodiment, wherein the selection mechanism choice 72 identifies the coherency module 51 as a selection mechanism, the selection parameters 74 associated with the coherency module 51 may include a radius parameter (R), a data item (e.g., pixel) local energy pair, $E^+_i$ and $E^-_i$. In considering an example in which a data item is a pixel, the letter 'i' may be used to label each pixel in the image. A '+' may be used to designate a selected pixel (e.g., foreground pixel) and '−' may be used to designate a non-selected pixel (e.g., background pixel). The control data 18 may also include a neighbor interaction energy strength (v0) and a neighbor interaction color spread. Other selection parameters may include an edge softness (or feather) amount and an edge choke amount, example.

The control data 19 is shown to include a number of activity controls 76-84, each of which includes an appropriate mechanism choice, and associated parameters. It will be noted that, in the example embodiment, the controls 76-84 correspond to the various adjustment mechanisms 52-60 described above with reference to FIG. 2. Accordingly, each of the mechanism choices identifies one or more mechanisms from the mechanisms 52-60 supported by the activity application 40. The associated parameters are utilized by the chosen mechanisms to perform their respective activities.

Figure 4:
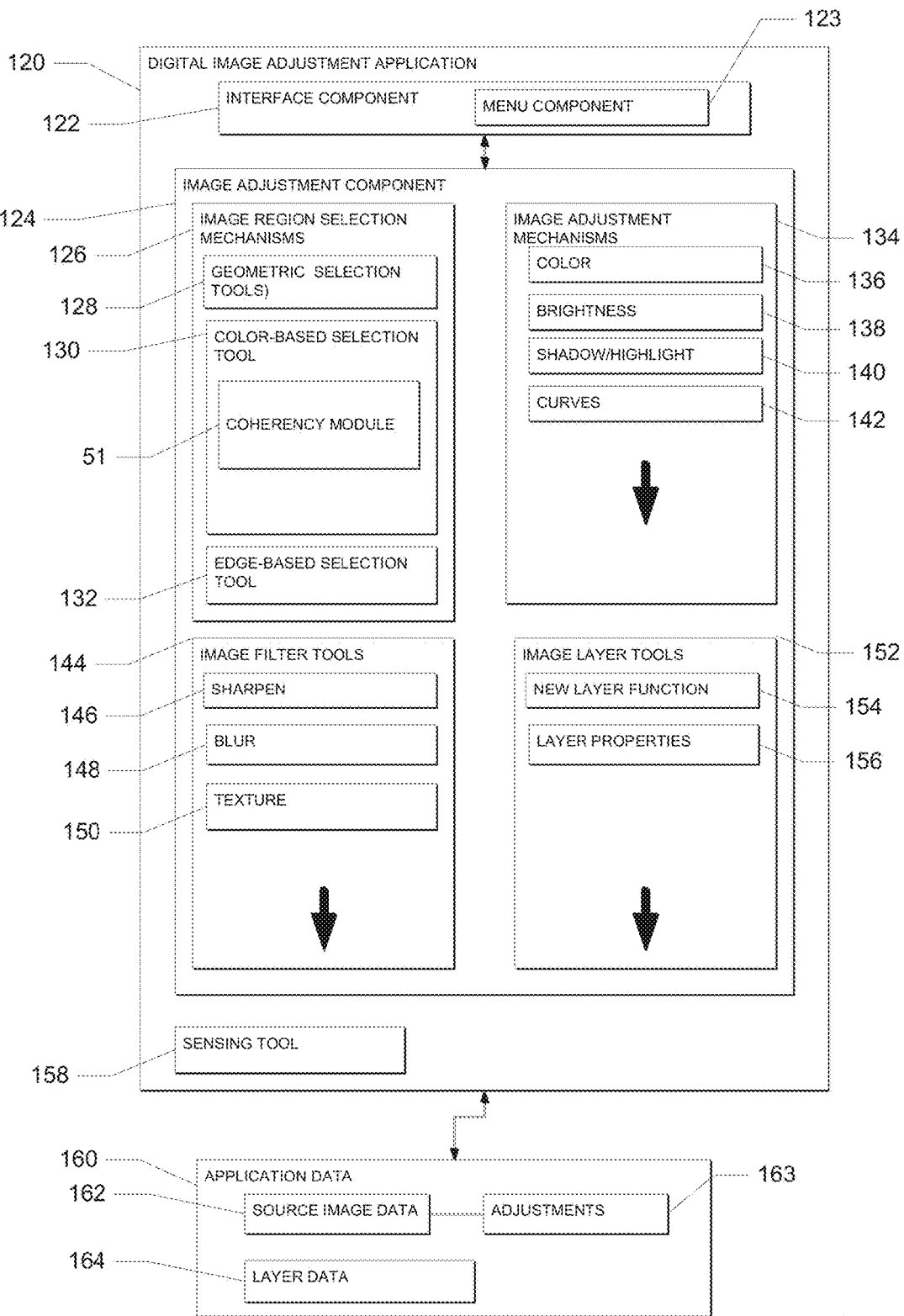
FIG. 4 is a block diagram illustrating an architecture of a digital data activity application, in the specific example form of a digital image adjustment application, according to one embodiment.

FIG. 4 is a block diagram illustrating an example embodiment of an activity application 40, in the form of a digital image adjustment application 120. The adjustment application 120 enables a user to perform various editing and modification operations with respect to digital images. One example of such an application is the ADOBE® PHOTOSHOP® application.

The adjustment application 120 is shown to include an interface component 122, and an image adjustment component 124. The image adjustment component 124 in turn incorporates a number of mechanisms, namely a collection of image region selection mechanisms 126, a collection of image adjustment mechanisms 134, a collection of image filter tools 144, and a collection of image layer tools 152. The image region selection mechanisms 126 assist a user in selecting a region of a digital image to which to apply any one or more of the image adjustment mechanisms 136 or the image filter tools 144. Example region selection mechanisms 126 include geometric selection tools 128, color-based selection tools 130 (e.g., the coherency module 51) and edge-based selection tools 132. In one embodiment, any one or more of the selection mechanisms 126-132 may be associated with a marker 16. For example, the selection mechanisms 126-132 may enable a marker 163 to perform a parametrically-controlled selection of a region of a digital image, with respect to a marker location identified by location data 18, utilizing measures of the spatial extent radius and further amount, color range, fuzziness, and edge sensitivity with respect to the marker location.

Example image adjustment mechanisms 134 are shown to include color, brightness, shadow/highlight and curve mechanisms 136, 138, 140 and 142.

The example image filter tools 144 include sharpen, blur and texture tools 146, 148 and 150. These also provide examples of adjustment mechanisms that may be applied with respect to source digital data 14.

The image layer tools 152 include a "new layer" function 154, and a layer properties function 156. As noted above, image layers provide examples of activity layers that may be applied with respect to source digital data 14, so as to enable activities to be applied with respect to a representation of underlying source digital data 14 in a non-destructive manner. In one embodiment, the image layer tools 152 may enable the creation of a layer (e.g., a marker layer) that is specifically adapted to accommodate one or more markers 163 to be applied with underlying image data. A selection mask, associated with the marker layer, may be built, utilizing a set of markers 163 and their associated parameters. A user is furthermore able to create a number of marker layers, each marker layer accommodating markers 163 having a certain common characteristic. Accordingly, unique sets of markers 163 may be associated with each of a number of distinct image layers. This feature allows a user conveniently to activate and deactivate such a group of markers 163 that are associated with a particular layer by activation and deactivation of the relevant image adjustment layer.

The image adjustment application 120 may also include sensing logic, in the example form of one or more sensing tools 158, that is configured to sense predetermined characteristics of an image feature or object within source image data 162, in a manner described, for example, above with reference to FIG. 2.

The application data 160 includes, inter alia, the source image data 162, with which one or more markers 163 are shown to be associated. The application data 160 also includes layer data 164 that may store an association of a subset of markers 163 with an image adjustment layer.

Figure 5:
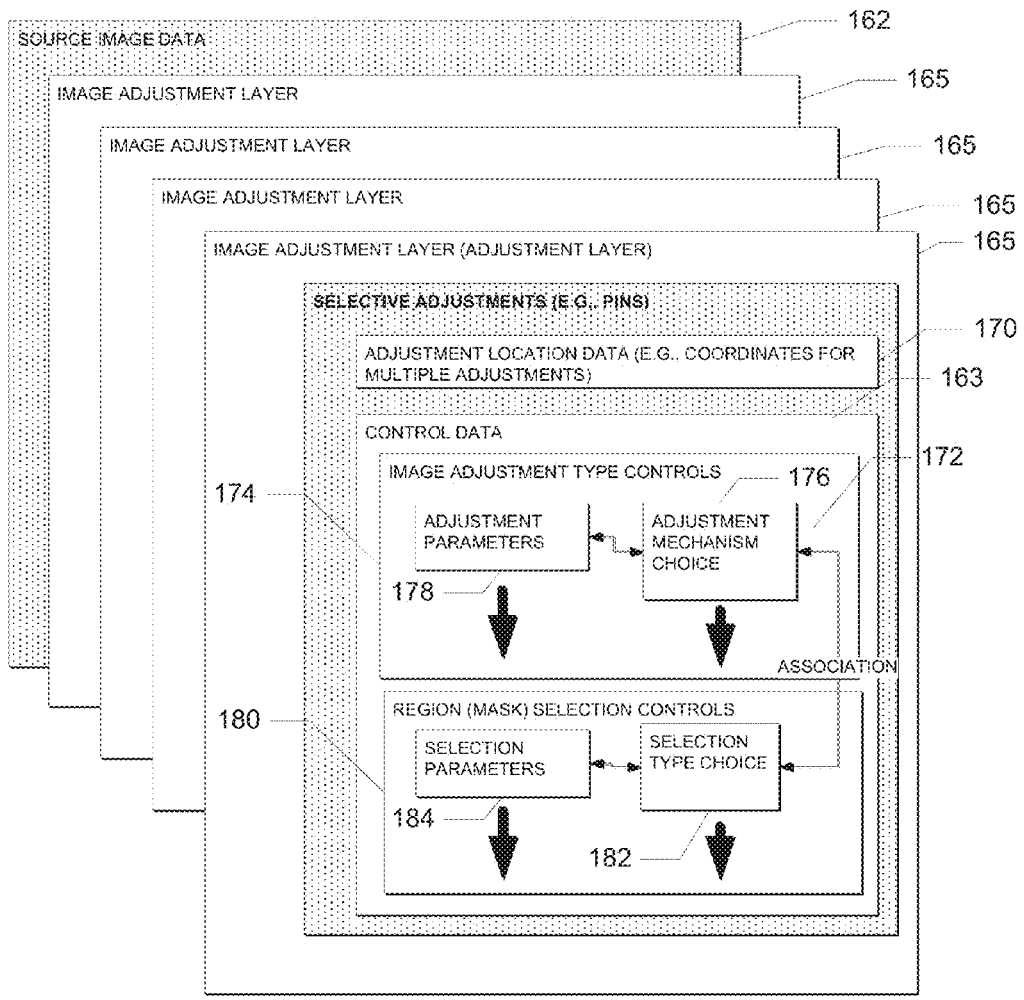
FIG. 5 is a block diagram illustrating a structure of image adjustment markers, which may be associated with one or more image adjustment layers in an example embodiment.

FIG. 5 is a block diagram providing a conceptual representation of the application of multiple image adjustment layers 165 to source image data 162, according to an example embodiment. As shown, any number of image adjustment layers 165 may be overlaid on a representation of the source image data 162 to modify a representation thereof. FIG. 5 illustrates the top image adjustment layer 165 having one or more markers "contained" or residing within the context of the marker layer. The markers 163 are shown to include location data 170 (e.g., the two-dimensional or three-dimensional coordinates with respect to the image data 162) and associated control data 172. The control data 172 in turn includes one or more image adjustment type controls 174, each indicating an adjustment mechanism choice 176 (e.g., brightness, shadow/light, levels, filters etc.), and one or more adjustment parameters 178 associated with each adjustment mechanism choice. For example, where the adjustment mechanism choice 176 indicates brightness, an associated adjustment parameter 178 may be a numeric value indicating whether this adjustment tool is to be negatively or positively applied, and also the extent to which the tool is to be positively or negatively applied.

The control data 172 also includes region (or mask) selection controls 180, including one or more selection type choices 182, and one or more selection parameters 184 associated with each such selection type choice 182. For example, a specific selection type choice 182 may indicate a spatial extent radius, feather, color range fuzziness, or edge sensitivity selection type, for example. Each of the selection type choices 182 has an associated selection parameter 184 associated therewith so as to enable a parametrically-controlled application of the selection type choice 182.

In one embodiment, each marker 163 may furthermore have one or more "toggle" or switch parameters associated therewith to enable a user selectively to activate and deactivate an appropriate adjustment mechanism and/or selection mechanism. To this end, a marker icon for a particular marker 163 may provide a visual representation of one or more "toggle" switches that enable a user to activate or deactivate an activity and/or selection mechanism associated with the underlying marker 163. In a further embodiment, switch parameters associated with a marker 163 may allow an activity or selection mechanism to be positively applied, negatively applied, or neutrally applied.

Figure 6:
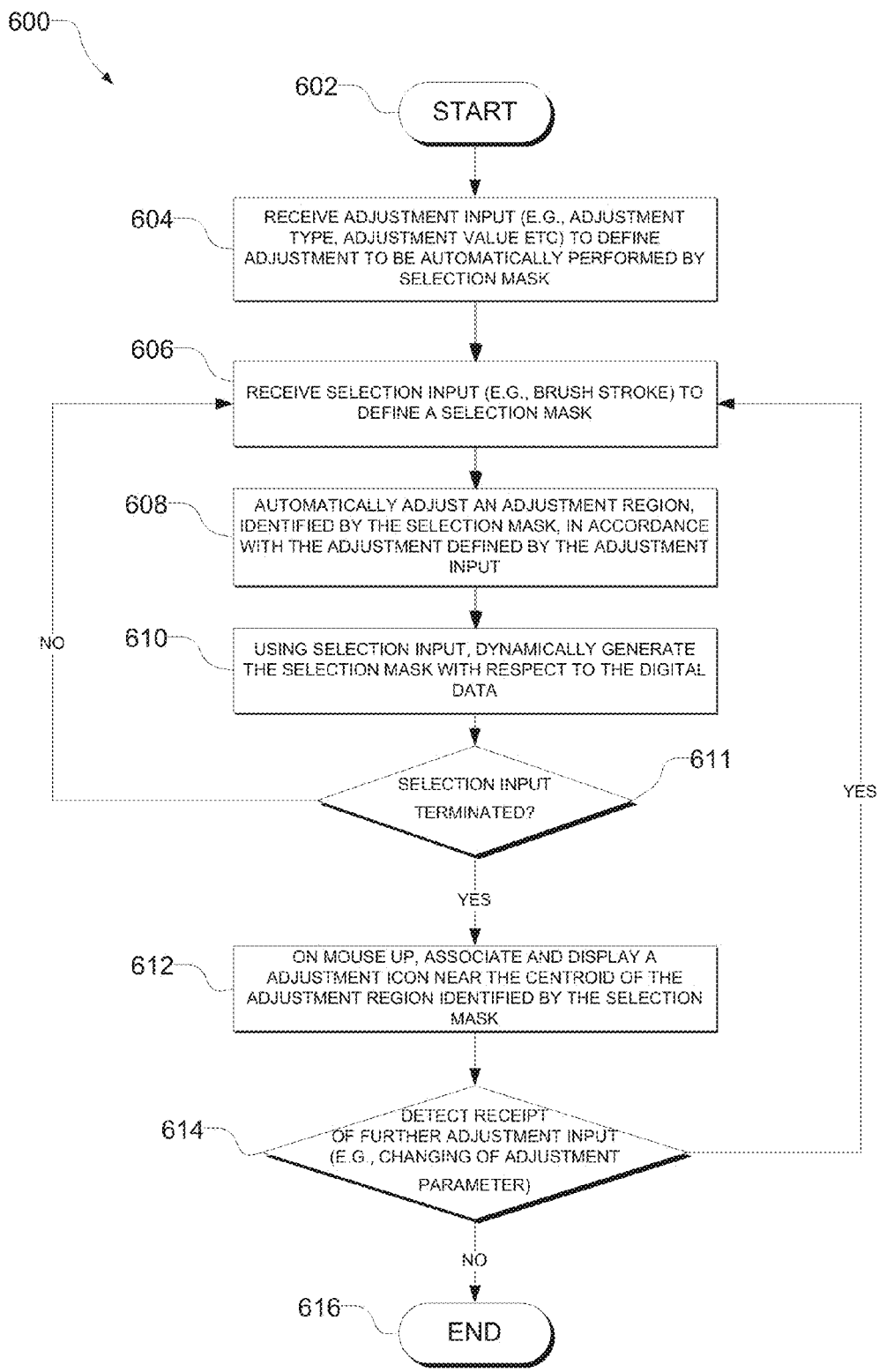
FIG. 6 is a flowchart illustrating a method, according to an example embodiment, to automatically define and associate an icon with a selection mask.

FIG. 6 is a flowchart illustrating a method 600, according to an example embodiment, to automatically associate a graphic representation (e.g., an icon, visual indicium or boundary identifier) with a selection mask. The method 600 commences at operation 602, and proceeds to operation 604 with the receipt, by the adjustment application 120 (e.g., the interface component 122), of adjustment input (e.g., an adjustment type, adjustment value, etc.) to define an adjustment to be automatically performed by a selection mask. In one embodiment, the adjustment input may include selection of a location data specification mechanism. One example of a location data specification mechanism may be a "brush" tool, which allows a user to perform a brush or stroke operation across digital data (e.g., digital image), thereby to select locations within the digital image. Another example of a location data selection mechanism may be a "pin" tool, or a marker, which is locatable using a drag and drop operation with respect to digital data (e.g., a digital image). For the purposes of illustration, the below discussion assumes the selection of a "brush" tool.

As noted above, the adjustment input may include an adjustment type and adjustment parameters or values. In one example embodiment, a user may select an adjustment type and adjustment parameters from one or more "preset" adjustments (e.g., the abovementioned skin adjustment or a blue sky adjustment), may accept default values for an adjustment type and adjustment parameters, or may choose adjustment type and adjustment parameters setting values from a set of options (e.g., presented as sliders in a dialog box, containing an adjustment slider for each of a set of adjustment parameters).

At operation 606, the interface component 122 of the adjustment application 120 may receive a selection input in order to define a selection mask.

Figure 7:
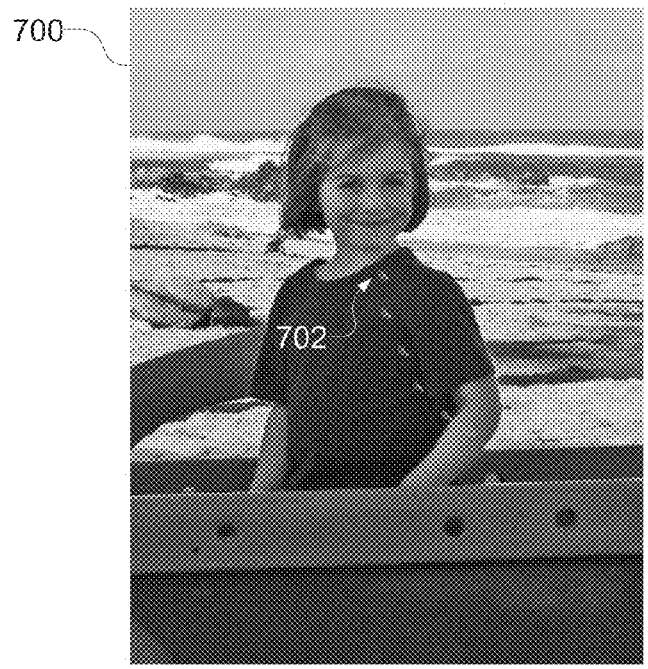
FIGS. 7-10 are representations of digital data, in the example form of a digital image, illustrating user interface input and output corresponding to various operations described with reference to the method illustrated in FIG. 6.

At operation 606, the interface component 122 of the adjustment application 120 receives a selection input (e.g., a brush stroke or a pin placement) in order to define a selection mask For example, referring to FIG. 7, utilizing a brush tool, a user may perform a brush or stroke operation over a digital image 700 as indicated by the brush path markers 702. With a number of strokes, a user is able to spread an adjustment to an object of interest in a digital image (e.g., the girl shown in the image 700). Multiple brush strokes may be applied to affect multiple regions or objects within the image 700, should this be desired by a user. Further, the adjustment application 120 may enable a user to erase adjustments (e.g., by use of the Alt key).

It should be noted that the received selection input may be a selection of one or more data elements (e.g., locations) with respect to digital data. For example, these data elements (e.g., locations) may be received as discreet inputs (e.g., a specific marker location), or as a continuum (e.g., a series of locations along a brush stroke path).

At operation 608, an appropriate selection mechanism 126 (e.g., the coherency module 51) of the adjustment application 120 utilizes the provided selection input (e.g., the brush stroke) to dynamically generate a selection mask (e.g., identifying the girl shown in the image 700) with respect to the digital data.

Accordingly, at operation 610, an appropriate adjustment mechanism 134 of the application 120 automatically adjusts an adjustment region, identified by an expanding selection mask, in accordance with the adjustment defined by the adjustment input received at operation 604. For example, where the adjustment input defined an adjustment to brighten and add contrast, the girl as a selected object within the image 700, may be brightened and contrasted in a "live" and interactive manner as the brush stroke proceeds on the brush path indicated by the brush path markers 702.

From the preceding description, it will be appreciated that the automatic adjustment of the adjustment region, as defined by the selection mask, may be performed contemporaneously with the receipt of the selection input. In other words, as the selection input is received to further define, expand or contract the selection mask, the adjustment is automatically applied to the modified region defined by the selection mask. In this way, the adjustment is dynamically flowed in accordance with the received selection input.

At decision operation 611, a determination is made as to whether the receipt of the selection input has been terminated (e.g., whether a user has performed a mouse-up, to end a brush stroke or has performed some other selection input terminating activity). If not, the method 600 loops back to operation 606 where a receipt of the selection input is continued. On the other hand, if a selection input is deemed to have been terminated, the method proceeds to operation 612.

Figure 8:
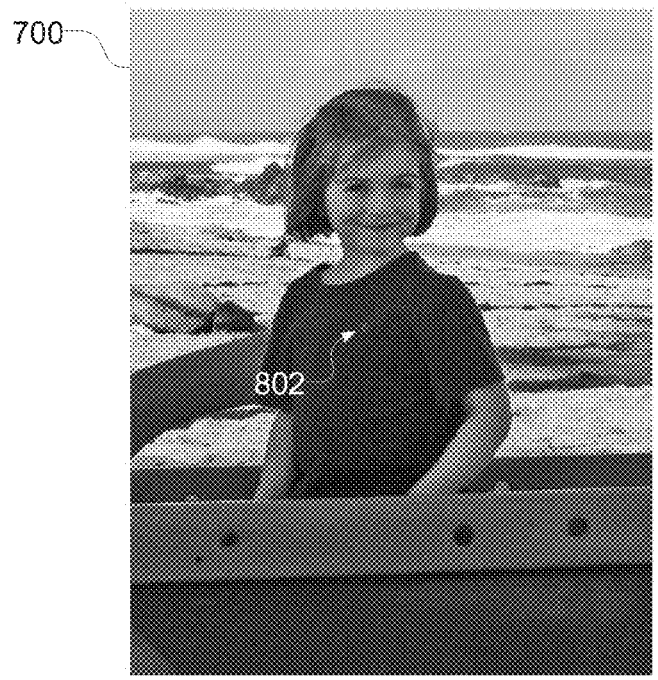

At operation 612, at detection of an event indicating the termination of a receipt of selection input (e.g., on a mouse-up event), the adjustment application 120 (e.g., the interface component 122) associates and displays a visual indicia with the selection mask. In one embodiment, the visual indicia may be a marker icon that is located near a centroid of an adjustment region defined by the selection mask. An example of such a marker icon is shown at 802, in FIG. 8, the marker icon 802 being located at or adjacent to a centroid of a selection mask around the girl shown in the image 700. The marker icon 802 may be user selectable, and operate as a reference, should a user wish to modify the selection mask or the parameters of the relevant adjustment. It will be appreciated that, in other example embodiments, the displayed visual indicia need not be a marker icon, but could be any visual indicia that identifies a selection mask. For example, the visual indicia may be a broken or solid line that depicts the boundaries of the selection mask. The visual indicia could also be a colored line (e.g. yellow) around the selected region, or a coloring or tinting (e.g., a gray out) of the selected region (or the background).

Figure 9:
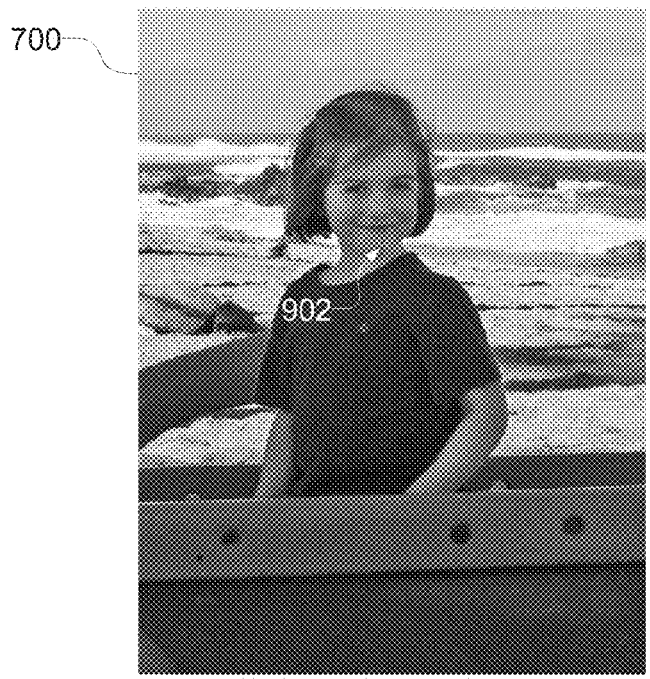
Figure 10:
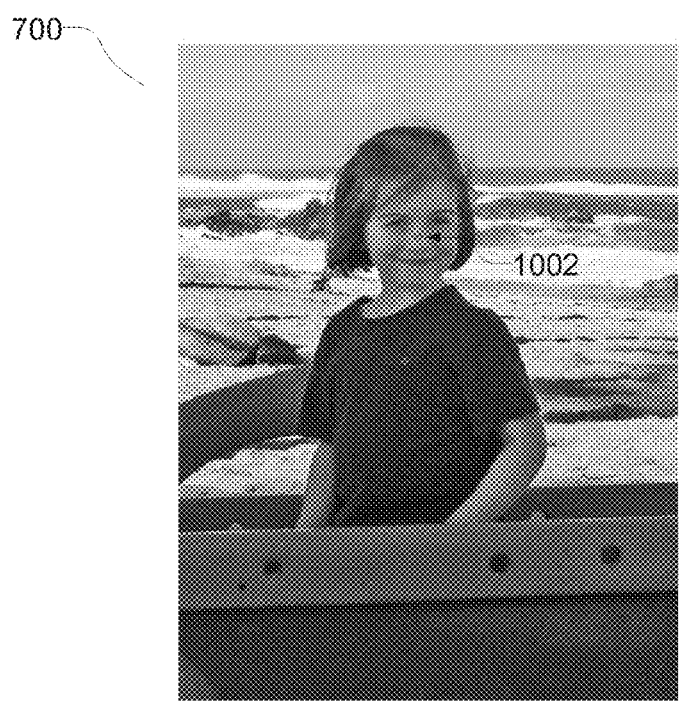

At decision operation 614, a determination is made regarding the receipt by the adjustment application 120 of further adjustment input (e.g., the modification of an adjustment type, or the changing of a value for a particular adjustment parameter). In one embodiment, once a user has performed an initial brush operation, the user may wish to change one or more adjustment parameters and in this way set up the adjustment application 120 for a next brush stroke. Again referring to the example image 700, a user may wish to apply more warmth to the face of the girl. In this case, the user may adjust the parameters or color balance, and then perform a further brushing operation, as indicated by the brush path markers 902 shown in FIG. 9. This further brushing operation may be used by an appropriate selection mechanism 126 of the adjustment application 120 to create a further selection mask for the face of the girl, with respect to the image 700. The adjustment application 120 may also then locate and display a visual indicia, in the example form of the marker icon 1002, at the centroid of the further selection mask. The display of the marker icon 1002 provides feedback to the user that a new and further adjustment has been created, and is available for editing.

Figure 11:
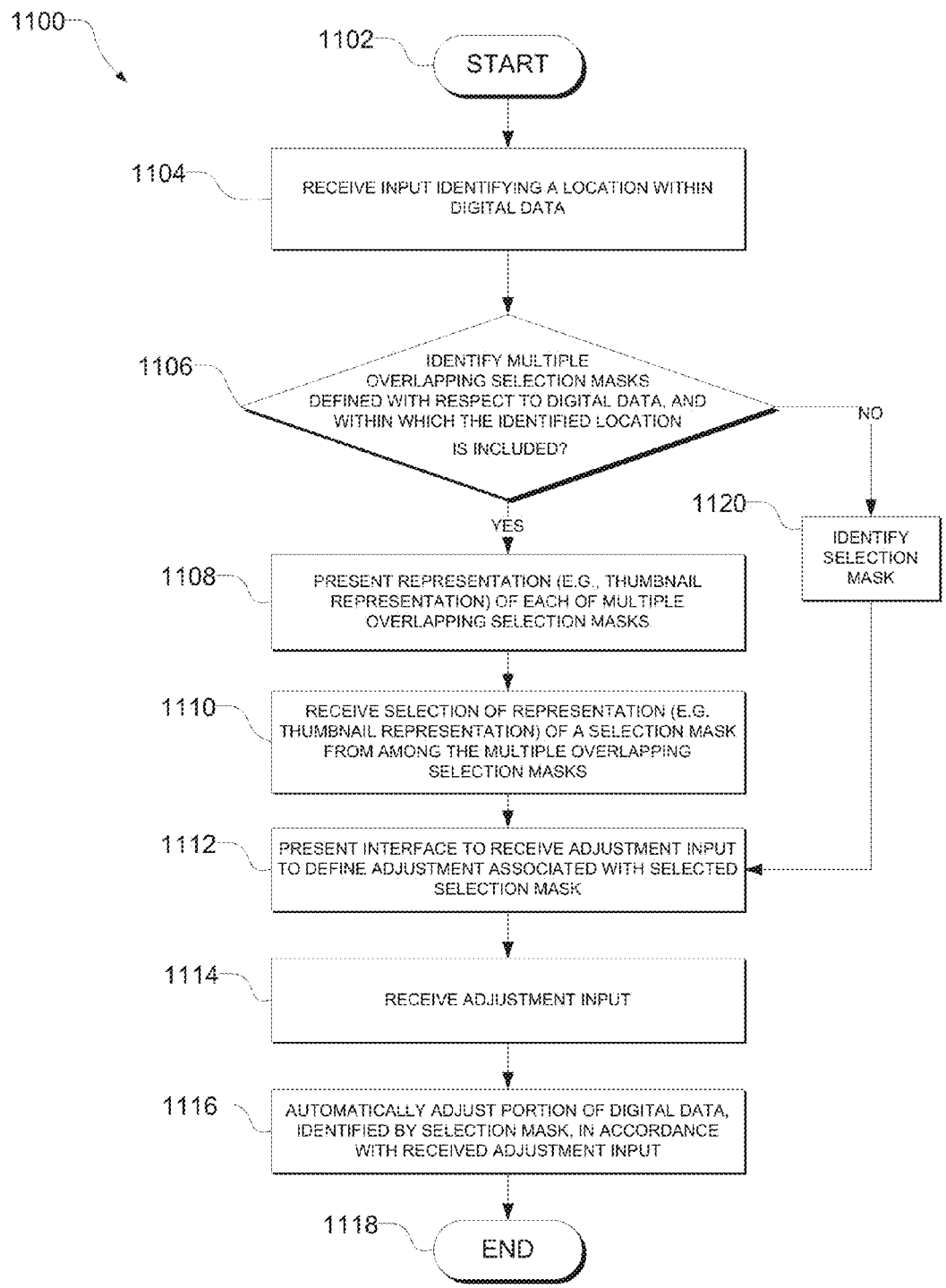
FIG. 11 is a flowchart illustrating a method, according to an example embodiment, to automatically identify and present representations of each of a number of overlapping selection masks with respect to digital data.

FIG. 11 is a flowchart illustrating a method 1100, according to an example embodiment, to present a representation of each of multiple overlapping mask selections with respect to digital data.

The method 1100 commences at operation 1102, and progresses to operation 1104, where input, identifying a location within digital data is received. In an example embodiment, the interface component 122 of the digital image adjustment application 120 may receive the input from a user (e.g., where the interface component 122 interacts with a graphical user interface of a computer system on which the digital image adjustment application 120 is executed). In other embodiments, the input may be received automatically. Referring to the example image 700, shown in FIG. 12 as an example of digital data, the receipt of the input may be responsive to a user performing a selection operation (e.g., double click) somewhere over the face of the girl depicted in the image 700.

Responsive to receipt of the input at operation 1104, a determination is made at decision operation 1106 as to whether there are multiple overlapping selection masks, defined with respect to the digital data and within which the identified location is included. For example, the interface component 122 may, responsive to a receipt of the input with respect to the digital image 700, determine that the two selection masks discussed above (e.g., the selection mask defining the face of the girl and the selection mask defining the entire body of the girl shown in image 700) are infected with respect to a location on the face of the girl. It will be appreciated that any number of selection masks may overlap and be applicable to an identified location within digital data. Similarly, the identified location may be included within one or zero selection masks defined with respect to the digital data.

In the event that multiple overlapping selection masks are identified at decision operation 1106, the interface component 122, and specifically, in one example embodiment, a menu component 123 of the interface component 122, may present a representation (e.g., a thumbnail representation of each of the multiple overlapping selection masks) at operation 1108. The representation of each of the selection masks may comprise a graphical representation of a respective portion of the digital data, as identified by the respective selection mask. For example, where the digital data is digital image data, the graphical representation may be a thumbnail representation of a respective portion of the digital data, the thumbnail representation comprising a cropped cutout of a respective portion of the digital data.

Figure 12:
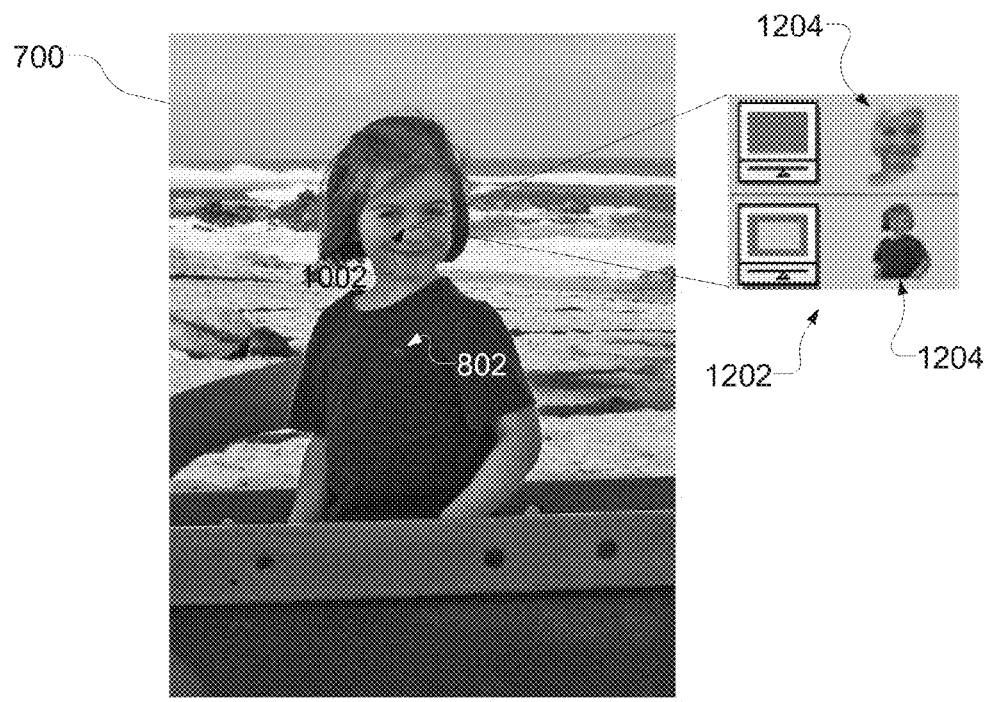
FIGS. 12-14 are representations of digital data, in the example form of digital images, representing various user interface presentations performed in accordance with the method described with reference to FIG. 11.

FIG. 12, for example, illustrates a context menu 1202, according to an example embodiment, of thumbnail representations of the image data of the image 700 included within the two selection masks that overlap and include the location indicated by the marker icon 1002. Accordingly, a user, by right clicking on the face of the girl shown in the image 700, may invoke the context menu 1202, thus presenting the user with a choice of existing adjustments that have affected a selected pixel beneath the cursor. The context menu 1202 accordingly provides an indication of the nature of each adjustment applied to the relevant pixel, and the cropped cutout thumbnail image provides an indication of the image region affected by each of the adjustments. A first menu item 1204 identifies a selection mask that affects the face of the girl, while a second menu item 1206 provides a thumbnail representation of the whole body of the girl that is encompassed by the second selection mask applicable at the location 1002 within the image 700.

Returning to FIG. 11, at operation 1110, the interface component 122 receives selection from a user of a representation (e.g., a thumbnail representation) of a selection mask from among the multiple overlapping selection masks.

Returning to FIG. 12, a selection of either of the menu items 1204 or 1206 may accordingly at operation 1110 constitute a selection by a user of a corresponding selection mask, this selection then being received by the interface component 1122.

Alternatively, as opposed to receiving a selection of a menu item 1204 or 1206, the selection of a particular selection mask may be received as a result of user selection of a visual indicia (e.g., the marker 1002 or 802 associated with their respective selection mask).

Figure 13:
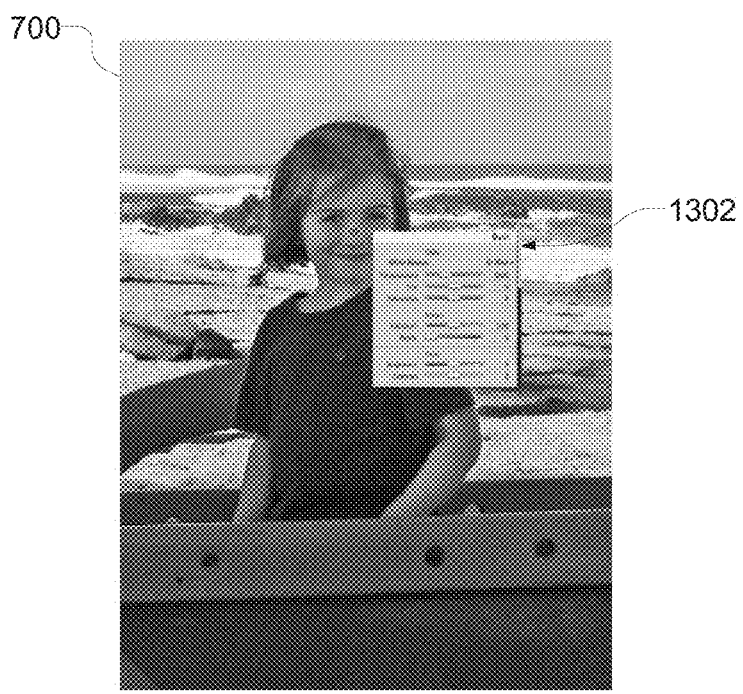

At operation 1112, responsive to receipt of the selection of a representation, the interface component 122, in conjunction with one or more images adjusting components 124 operates to present to a user an interface to receive adjustment input to define an adjustment associated with the selected adjustment mask. For example, FIG. 13 shows an example adjustment menu 1302 which presents a number of graphical sliders for various image adjustment mechanisms 134 (e.g., temperature, tint, saturation, range (exposure, black), and tone (brightness and contrast)). A user, using the adjustment menu 1302 may conveniently move any of the sliders to control the various adjustment parameters, and see how the modified and further defined adjustment affects the image area identified by the associated selection mask.

Accordingly, at operation 1114, the interface component 122 may receive adjustment input, applicable to an adjustment associated with the selected selection mask (e.g., via the adjustment menu 1302), and then, at operation 1116, automatically adjust a portion of the digital data, identified by the selection mask, in accordance with the received adjustment input. As noted above, the automatic adjustment performed at operation 1116 may be performed in a real time, "live" manner so that the user can immediately appreciate the effect of the adjustment input on the digital data.

Figure 14:
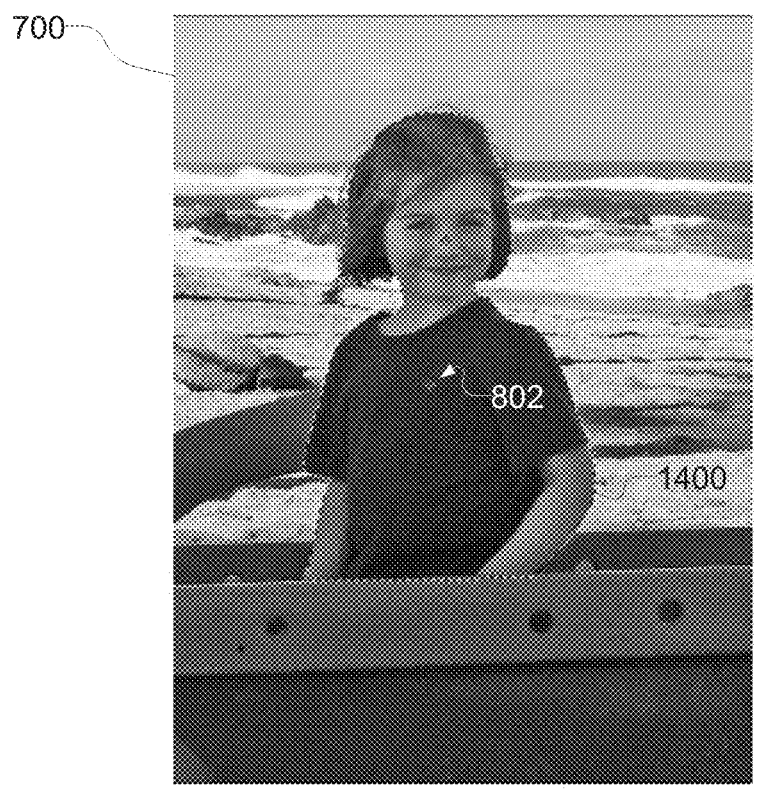

Returning to decision operation 1106, if it is determined that the location identified by the received input does not include multiple, overlapping selection masks (e.g., the identified location is included within the bounds of only a single selection mask), the method 1100 proceeds to block 1120, where the relevant selection mask is identified and visually presented to the user. Referring to FIG. 14, for example, user selection of the body marker icon 802, or a user identification of any body location outside the face area, may produce a temporary presentation of a broken line (also known as "marching ants") to highlight the relevant selection mask. In one embodiment, the method 1100 may then progress to block 1112, where the interface component 122 may present an interface to receive adjustment input to define the adjustment associated with the selected selection mask, wherefrom the method 1100 may then progress through the operations 1114-1118.

In a further embodiment, the identification of a selection mask for the body may also have been generated responsive to user selection of the menu item 1206 of the menu 1202, shown in FIG. 12, for example.

The method 1100 then terminates at operation 1118.

Figure 15:
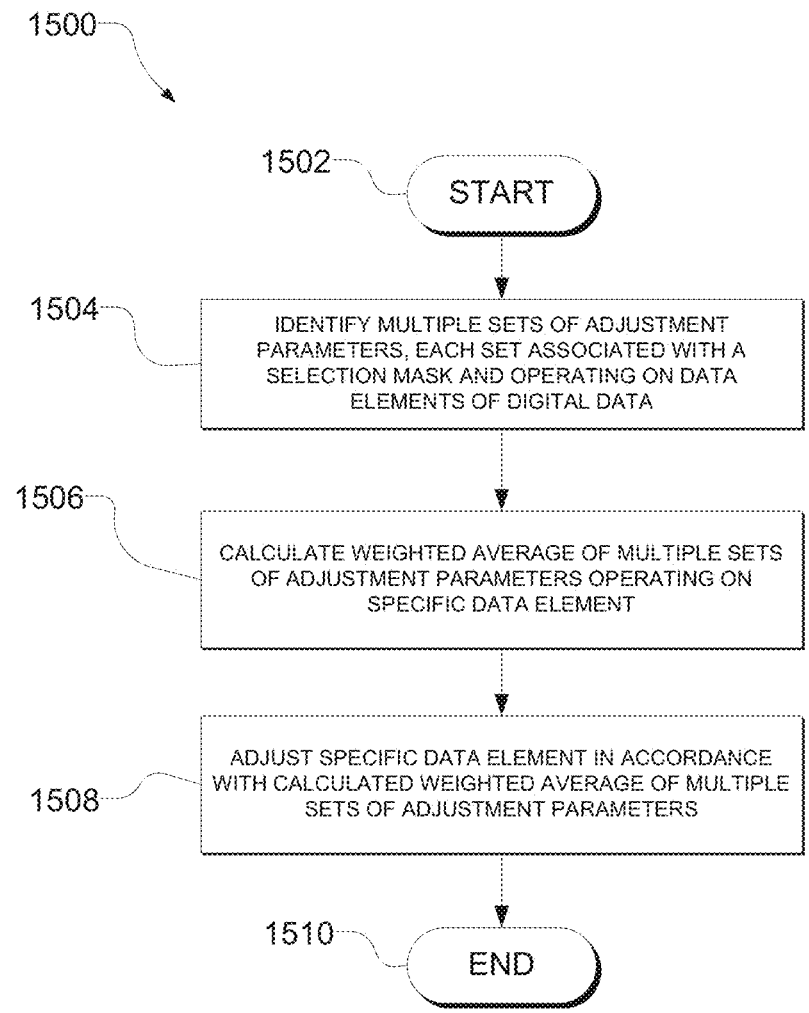
FIG. 15 is a flowchart illustrating a method, according to an example embodiment, to adjust data elements of digital data, in accordance with a calculated weighted average of multiple sets of adjustment parameters associated with overlapping selection masks.

FIG. 15 is a flowchart illustrating a method 1500, according to an example embodiment to apply a cumulative effect of multiple adjustment parameters, applicable to a specific data element, to adjust a characteristic (e.g., the visual appearance) of the data element).

Where multiple adjustments, each associated with a respective selection mask, are applicable to a particular instance of digital data (e.g., a digital photograph), one approach is a so-called "layered approach" to application of adjustments. In a layer-approach, each of the multiple adjustments is associated with a unique layer, and each of the layers has an ordering of application. One downside of such a layered approach is that the order of operations (e.g., the order in which the adjustments are applied, as dictated by the layer ordering) can make a difference in the final cumulative result of the adjustment to a specific data element. The example method proposed below provides a "flat" implementation, in which the order of the adjustments does not affect a eventual cumulative adjustment as applied to a specific data element by multiple adjustments. In an example embodiment, the below described method may be implemented within a single "layer" within an image editing application (e.g., the ADOBE®) PHOTOSHOP® application).

The method 1500 will be below described as reference to an example embodiment, in which the digital data comprises a digital image, and the various adjustments that are applied to that digital image are image adjustments. However, it will be appreciated that the digital data may be any form of digital data (e.g., image, video, audio, alpha numeric, etc.), and the adjustments may be appropriate to the digital data type. In the example method 1500, multiple adjustments are applied in a fixed order (e.g., contrast, brightness, saturation, tone, temperature, blur, noise, etc.). A user may have access to a set of sliders, each slider being dedicated to a specific adjustment and movable to control the amount by which each adjustment is applied to the digital data. Parameter values (e.g., pixel parameter values), which actually define an amount of an adjustment at each data element (e.g., pixel of an image), may be determined by combining slider parameters with underlying selection masks. Where multiple selection masks are present, each adjustment parameter may be a weighted average of the adjustment parameters for a specific selection mask.

The method 1500 commences at operation 1502, and progresses to operation 1504 with the identification of multiple sets of adjustment parameters, each set being associated with a selection mask and operating on data elements of digital data. For example, the identification of the multiple sets may be performed by an identification module 51 responsive to user identification, via the interface component 122 of the digital image adjustment application 120, of a specific location within a digital image, and the identification, definition or activation of the multiple sets of adjustment parameters to operate on the data elements of the digital data.

Alternatively, the identification of the multiple sets of adjustment parameters may be performed responsive to user selection of the respective selection mask with which the multiple sets of adjustment parameters are associated.

The method 1500 then progresses to operation 1506 where a cumulative data adjustment mechanism (e.g., a weighted average adjustment module 53 included within the data adjustment mechanisms 52) calculates a weighted average of the multiple sets of adjustment parameters operating on a specific data element of the digital data. In one embodiment, the calculation of the weighted average includes determining an opacity for each set of the multiple sets of adjustment parameters, and using the opacity in the calculation of the weighted average. Further, the weighted average of the multiple sets of adjustment parameters with respect to a specific data element of the digital data may reduce to a product of a first set of adjustment parameters or first selection mask, and a first opacity of the first selection mask, where the selection mask does not overlap with any further selection masks with respect to the specific data element.

Alternatively, the weighted average of the multiple sets of adjustment parameters may reduce to zero, where a further specific data element of the digital data does not fall within a selection mask.

In one embodiment, the calculation of the weighted average for the multiple sets of adjustment parameters may be automatically performed by the weighted average adjustment module 53 according to the equation provided below with respect to a specific implementation of the method 1500 with respect to digital image data. At block 1508, the weighted average adjustment module 53 may proceed to adjust a specific data element, within a set of data elements of digital data, in accordance with a calculated weighted average of the multiple sets of adjustment parameters, as calculated at operation 1506. Specifically, the weighted average of the multiple sets of adjustment parameters may be reduced to an adjustment operator which operates on the digital data.

The method then ends at block 1501.

We below provide a description of an example application of the method 1500, with specific respect to application of a set (e.g., vector) of adjustment parameters for an example adjustment to digital data in the example form of digital image data. Let $\lambda(a)$ be the set (vector) of adjustment parameters (e.g., contrast amount, brightness amount, etc.) for the adjustment labeled 'a', where a ranges from 0 to the N−1, N being the number of adjustments that have been made (which is the same as the number of markers which appear on the image). The value, $\lambda(r)$, for the adjustment parameters which are to operate on each pixel at location r in the image according needs to be determined. Also, let $\alpha(a)(r)$ be the selection mask opacity for the ath adjustment. This is obtained from the Quick Selection algorithm applied to the brush strokes used to make that adjustment. Then, one method of combining the various adjustments to produce parameters at each pixel is the following:

$$\lambda(r)=\Sigma a\lambda(a)\alpha(a)(r)/[\Sigma a\alpha(a)(r)+\Pi a(1-\alpha(a)(r))]$$

where $\Sigma$ denotes the summation over all of the adjustment indices, 'a', and $\Pi$ represents the product.

This has the property that it reduces to the product, $\lambda(a)\alpha(a)(r)$, the parameter values modulated by the selection opacity strength, in region 'a' if there is no overlap with the other regions. If there is indeed overlap, then it reduces to the mean of the parameters from the overlapping regions where the selection opacities are unity. Further, in areas of the image for which all the opacities vanish (no selection has been made there), this reduces to 0. Zero values for the parameters indicate no change to the image—the identity adjustment.

The above equation is but one of many methods of combining adjustment parameters. It has the properties described above and produces results which are independent of the order of application of the adjustments. If $A(\lambda(r))$ is the adjustment operator which operates on the image, I(r), then the adjusted image, after application of all the various adjustments, can be represented by $$I'(r)=A(\lambda(r))I(r),$$

with $\lambda(r)$ given above.

Figure 16:
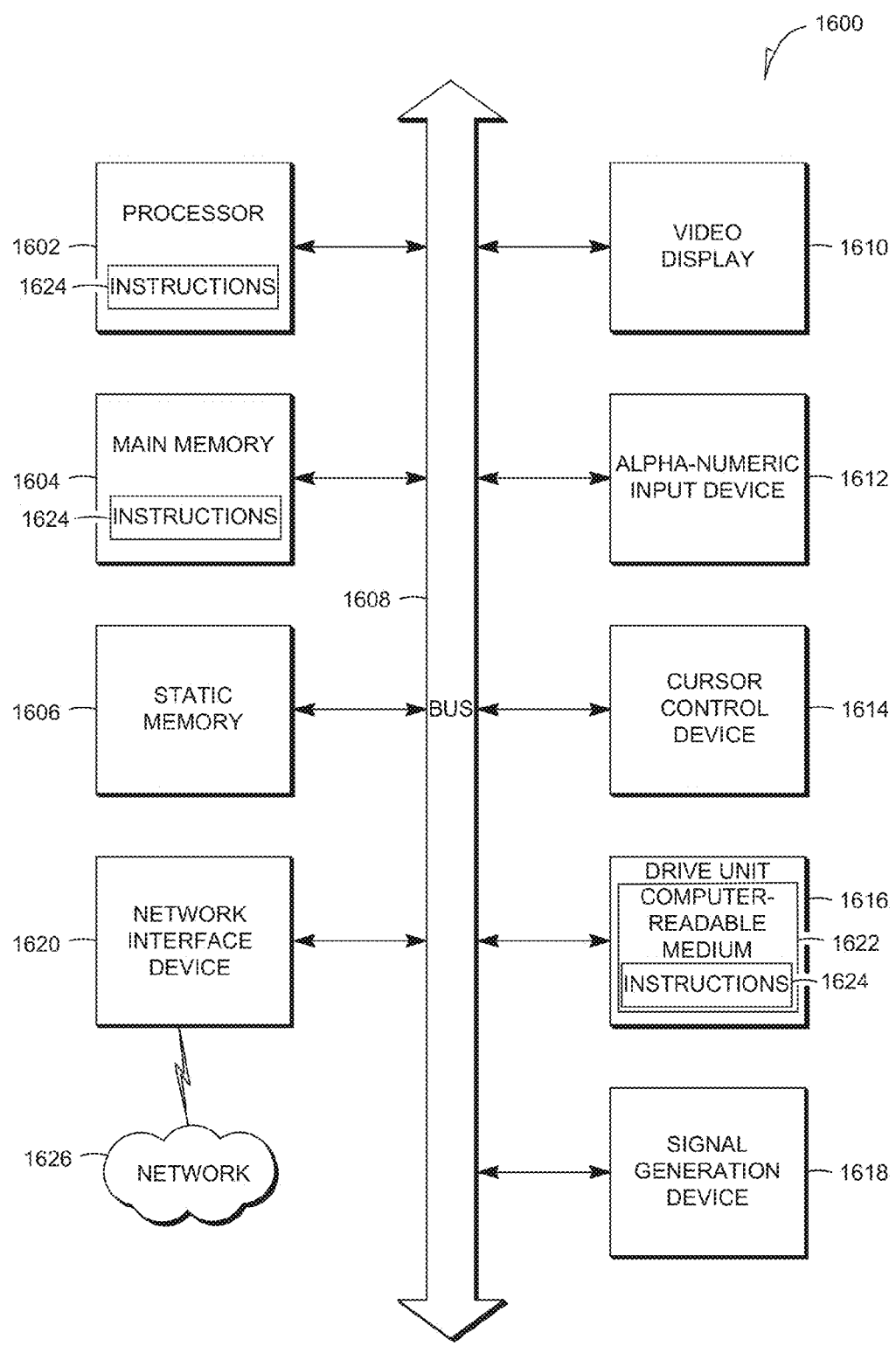
FIG. 16 is a block diagram illustrating a machine, in the example form of a computer system, to execute a set of instructions, thereby to cause the machine to perform any one of the example methods described herein.

FIG. 16 shows a diagrammatic representation of machine in the example form of a computer system 1600 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, an embedded system or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU) a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a cursor control device 1614 (e.g., a mouse), a disk drive unit 1616, a signal generation device 1618 (e.g., a speaker) and a network interface device 1620.

The disk drive unit 1616 includes a machine-readable medium 1622 on which is stored one or more sets of instructions (e.g., software 1624) embodying any one or more of the methodologies or functions described herein. The software 1624 may also reside, completely or at least partially, within the main memory 1604 and/or within the processor 1602 during execution thereof by the computer system 1600, the main memory 1604 and the processor 1602 also constituting machine-readable media.

The software 1624 may further be transmitted or received over a network 1626 via the network interface device 1620.

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and a system to perform a selection with respect to digital data have been described. Although the present invention has been described with reference to specific example embodiments, it will be evident that various modifications and changes may be made to these embodi-

What is claimed is:

1. A method comprising:
receiving an input location with respect to digital data,
the input location being included in a first portion of the digital data and included in a second portion of the digital data that overlaps the first portion by at least the input location;
identifying a first selection mask and a second selection mask that overlaps the first selection mask, the identifying being based on the received input location, the first and second selection masks each being applicable to the received input location,
the first selection mask being defined by the first portion of the digital data,
the second selection mask being defined by the second portion of the digital data,
the identifying of the first and second selection masks being performed by a processor of a machine;
presenting a menu that includes a selectable representation for each of the overlapped first and second selection masks, the menu including a first representation of the first selection mask and a second representation of the second selection mask that overlaps the first selection mask; and
receiving a selection of the first representation of the first selection mask from the presented menu.

2. The method of claim 1 further comprising:
presenting an interface configured to receive an adjustment input that corresponds to the first selection mask selected by receiving the selection of the first representation of the first selection mask.

3. The method of claim 2 further comprising:
receiving the adjustment input that corresponds to the first selection mask; and
adjusting the first portion of the digital data based on the received adjustment input.

4. The method of claim 2, wherein:
the presenting of the interface configured to receive the adjustment input includes presenting a graphical slider that is operable to define the adjustment input that corresponds to the first selection mask.

5. The method of claim 4, wherein:
the graphical slider is operable to define the adjustment input that corresponds to the first selection mask by specifying at least one of temperature, tinted, saturation, range, brightness, or contrast.

6. The method of claim 1 further comprising:
receiving a selection of a marker that is displayed with the first selection mask and that corresponds to the first selection mask.

7. The method of claim 1, wherein:
the presenting of the menu includes presenting the first representation of the first selection mask as a first thumbnail image that indicates the first portion of the digital data.

8. The method of claim 7, wherein:
the presenting of the menu includes presenting the second representation of the second selection mask as a second thumbnail image that indicates the second portion of the digital data.

9. The method of claim 1, wherein:
the presenting of the menu that includes the first and second representations is in response to the receiving of the input location with respect to the digital data.

10. The method of claim 1, wherein:
the identifying of the first and second selection masks includes identifying a first adjustment previously applied to the first portion of the digital data.

11. The method of claim 10, wherein:
the presenting of the menu that includes the first representation of the first selection mask includes indicating the first adjustment previously applied to the first portion of the digital data.

12. The method of claim 10, wherein:
the identifying of the first and second selection masks includes identifying a second adjustment previously applied to the second portion of the digital data.

13. The method of claim 12, wherein:
the presenting of the menu that includes the second representation of the second selection mask includes indicating the second adjustment previously applied to the second portion of the digital data.

14. A non-transitory machine-readable storage medium comprising instructions that, when executed by one or more processors of a machine, cause the machine to perform operations comprising:
receiving an input location with respect to digital data,
the input location being included in a first portion of the digital data and included in a second portion of the digital data that overlaps the first portion by at least the input location;
identifying a first selection mask and a second selection mask that overlaps the first selection mask, the identifying being based on the received input location, the first and second selection masks each being applicable to the received input location,
the first selection mask being defined by the first portion of the digital data,
the second selection mask being defined by the second portion of the digital data,
the identifying of the first and second selection masks being performed by the one or more processors of the machine;
presenting a menu that includes a selectable representation for each of the overlapped first and second selection masks, the menu including a first representation of the first selection mask and a second representation of the second selection mask that overlaps the first selection mask; and
receiving a selection of the first representation of the first selection mask from the presented menu.

15. The non-transitory machine-readable storage medium of claim 14, wherein the operations further comprise:
presenting an interface configured to receive an adjustment input that corresponds to the first selection mask selected by receiving the selection of the first representation of the first selection mask.

16. A system comprising:
a processor configured by an interface component to:
receive an input location with respect to digital data, the input location being included in a first portion of the digital data and included in a second portion of the digital data that overlaps the first portion by at least the input location; and to
identify a first selection mask and a second selection mask that overlaps the first selection mask, the identifying being based on the received input location, the first and second selection masks each being applicable to the received input location, the first selection mask being defined by the first portion of the digital data, the second selection mask being defined by the second portion of the digital data; and a menu component configured to present a menu that includes a selectable representation for each of the overlapped first and second selection masks, the menu including a first representation of the first selection mask and a second representation of the second selection mask that overlaps the first selection mask; and wherein the processor is configured by the interface component to receive a selection of the first representation of the first selection mask from the presented menu.

17. The system of claim 16, wherein:

the processor is configured by the interface component to present an interface configured to receive an adjustment input that corresponds to the first selection mask selected by receiving the selection of the first representation of the first selection mask.

\* \* \* \* \*